US012700414B2

(12) United States Patent
Wang et al.

(10) Patent No.: US 12,700,414 B2
(45) Date of Patent: Aug. 4, 2026

(54) MULTI-CHANNEL SIGNAL ENCODING METHOD, MULTI-CHANNEL SIGNAL DECODING METHOD, ENCODING DEVICE, DECODING DEVICE, AND TERMINAL DEVICE

(71) Applicant: HUAWEI TECHNOLOGIES CO., LTD., Shenzhen (CN)

(72) Inventors: Zhi Wang, Shenzhen (CN); Zhe Wang, Beijing (CN); Haiting Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 18/884,337

(22) Filed: Sep. 13, 2024

(65) Prior Publication Data

US 2025/0006209 A1 Jan. 2, 2025

Related U.S. Application Data

(63) Continuation of application No. PCT/CN2023/073845, filed on Jan. 30, 2023.

(30) Foreign Application Priority Data

Mar. 14, 2022 (CN) ......................... 202210254868.9
Jun. 20, 2022 (CN) ......................... 202210699863.7

(51) Int. Cl.
*G10L 19/008* (2013.01)
*G10L 19/002* (2013.01)

(52) U.S. Cl.
CPC .......... *G10L 19/008* (2013.01); *G10L 19/002* (2013.01)

(58) Field of Classification Search
None
See application file for complete search history.

(56) References Cited

U.S. PATENT DOCUMENTS 5,987,417 A * 11/1999 Heo ................ G11B 20/10527 386/E9.017
6,081,783 A * 6/2000 Divine .................... H03M 7/30 704/201

(Continued)

FOREIGN PATENT DOCUMENTS

TW 200939864 A 9/2009

OTHER PUBLICATIONS

Herre J et al:"Extending the MPEG-4 AAC CODEC by Perceptual Noise Substitution", Preprints of Papers Presented at the AES Convention, XX, XX, Jan. 1, 1998 (Jan. 1, 1998), pp. 1-14, XP008006769.

(Continued)

*Primary Examiner* — Jakieda R Jackson

(57) ABSTRACT

This application disclose a multi-channel signal encoding method, a multi-channel signal decoding method, and a terminal device for processing multi-channel signal. The multi-channel signal encoding method includes: obtaining silent flag information of a multi-channel signal, where the silent flag information includes a silent enable flag and/or a silent flag; and performing multi-channel encoding processing on the multi-channel signal to obtain a transmission channel signal of each transmission channel; and generating a bitstream based on the transmission channel signal of each transmission channel and the silent flag information, where the bitstream includes the silent flag information and a multi-channel encoding result of the transmission channel signal. In this application, the transmission channel signal of each transmission channel is encoded based on the silent flag information to generate the bitstream, and a silent status of (Continued)

the multi-channel signal is considered, so that encoding efficiency and encoding bit resource utilization are improved.

20 Claims, 10 Drawing Sheets

(56) References Cited

U.S. PATENT DOCUMENTS

| | | | | |
|---|---|---|---|---|
| 6,112,170 | A * | 8/2000 | Patwardhan | G10L 19/083 704/503 |
| 6,125,398 | A * | 9/2000 | Mirashrafi | H04L 12/1822 370/263 |
| 6,334,026 | B1 * | 12/2001 | Xue | H04N 21/4341 360/48 |
| 2001/0016011 | A1 * | 8/2001 | Otsuka | H04N 21/234327 375/E7.271 |
| 2010/0076772 | A1 * | 3/2010 | Kim | G10L 19/008 704/500 |
| 2011/0040556 | A1 * | 2/2011 | Moon | G10L 19/008 704/205 |
| 2012/0198309 | A1 * | 8/2012 | Alves | G06F 11/10 714/763 |
| 2016/0104491 | A1 * | 4/2016 | Lee | G10L 19/008 381/22 |
| 2016/0155456 | A1 * | 6/2016 | Wang | G10L 25/81 704/208 |
| 2017/0018277 | A1 * | 1/2017 | Wang | G10L 19/06 |
| 2019/0221219 | A1 * | 7/2019 | Wang | G10L 19/008 |
| 2021/0367710 | A1 * | 11/2021 | Mouchel La Foss | H04L 69/324 |

OTHER PUBLICATIONS

Extended European Search Report issued in EP Application No. 23769452.6 dated Jan. 24, 2025.

* cited by examiner

MULTI-CHANNEL SIGNAL ENCODING METHOD, MULTI-CHANNEL SIGNAL DECODING METHOD, ENCODING DEVICE, DECODING DEVICE, AND TERMINAL DEVICE

CROSS-REFERENCE TO RELATED APPLICATIONS

This application is a continuation of International Application No. PCT/CN2023/073845, filed on Jan. 30, 2023, which claims priority to Chinese Patent Application No. 202210254868.9, filed on Mar. 14, 2022 and Chinese Patent Application No. 202210699863.7, filed on Jun. 20, 2022. All of the aforementioned patent applications are hereby incorporated by reference in their entireties.

TECHNICAL FIELD

This application relates to the audio encoding and decoding field, and in particular, to a multi-channel signal encoding method, a multi-channel signal decoding method, an encoding device, a decoding device, and a terminal device.

BACKGROUND

Audio data compression is an indispensable part of media application such as media communication and media broadcasting. Audio data compression may be implemented through multi-channel encoding. Multi-channel encoding may be encoding a sound bed signal having a plurality of channels, or multi-channel encoding may be encoding a plurality of object audio signals. Alternatively, multi-channel encoding may be encoding a mixed signal including both a sound bed signal and an object audio signal.

The sound bed signal, the object signal, and the mixed signal including the sound bed signal and the object audio signal each may be input into an audio channel as a multi-channel signal. Features of multi-channel signals cannot be completely the same, and the features of the multi-channel signals constantly change.

Currently, the foregoing multi-channel signal is processed by using a fixed encoding scheme, for example, processed by using a unified bit allocation scheme, and quantization and encoding are performed on the multi-channel signal based on a bit allocation result. Although the foregoing unified bit allocation scheme has an advantage of being simple and easy to operate, there are problems of low encoding efficiency and a waste of encoding bit resources.

SUMMARY

Embodiments of this application provide a multi-channel signal encoding method, a multi-channel signal decoding method, an encoding device, a decoding device, and a terminal device, to improve encoding efficiency and encoding bit resource utilization.

To resolve the foregoing technical problem, embodiments of this application provide the following technical solutions.

According to a first aspect, an embodiment of this application provides a multi-channel signal encoding method, including:

obtaining silent flag information of a multi-channel signal to obtain the silent flag information, where the silent flag information includes a silent enable flag and/or a silent flag;

performing multi-channel encoding processing on the multi-channel signal to obtain a transmission channel signal of each transmission channel; and generating a bitstream based on the transmission channel signal of each transmission channel and the silent flag information, where the bitstream includes the silent flag information and a multi-channel quantization and encoding result of the transmission channel signal of each transmission channel.

In the foregoing solution, the silent flag information of the multi-channel signal includes the silent enable flag and/or the silent flag; multi-channel encoding processing is performed on the multi-channel signal to obtain the transmission channel signal of each transmission channel; and the bitstream is generated based on the transmission channel signal of each transmission channel and the silent flag information, where the bitstream includes the silent flag information and the multi-channel quantization and encoding result of the transmission channel signal of each transmission channel. In embodiments of this application, the transmission channel signal of each transmission channel is encoded based on the silent flag information to generate the bitstream, and a silent status of the multi-channel signal is considered, so that encoding efficiency and encoding bit resource utilization are improved.

In a possible implementation, the multi-channel signal includes a sound bed signal and/or an object signal; and the silent flag information includes the silent enable flag, and the silent enable flag includes a global silent enable flag or a partial silent enable flag, where the global silent enable flag is a silent enable flag acting on the multi-channel signal; or the partial silent enable flag is a silent enable flag acting on a part of channels in the multi-channel signal.

In a possible implementation, when the silent enable flag is the partial silent enable flag, the partial silent enable flag is an object silent enable flag acting on the object signal, or the partial silent enable flag is a sound bed silent enable flag acting on the sound bed signal, or the partial silent enable flag is a silent enable flag acting on another channel signal that does not include a non-low frequency effect LFE channel signal in the multi-channel signal, or the partial silent enable flag is a silent enable flag acting on a channel signal that participates in pairing in the multi-channel signal.

In the foregoing solution, silent indication can be performed for the sound bed signal and/or the object signal by using the global silent enable flag or the partial silent enable flag, so that subsequent encoding processing, for example, bit allocation, is performed based on the global silent enable flag or the partial silent enable flag. This can improve encoding efficiency.

In a possible implementation, the multi-channel signal includes a sound bed signal and an object signal;

the silent flag information includes the silent enable flag, and the silent enable flag includes a sound bed silent enable flag and an object silent enable flag; and the silent enable flag occupies a first bit and a second bit, the first bit is used to carry a value of the sound bed silent enable flag, and the second bit is used to carry a value of the object silent enable flag.

In the foregoing solution, the silent enable flag may indicate a specific implementation of the silent enable flag by using different bits. For example, the first bit and the second bit are predefined. The different bits can indicate that the silent enable flag is the sound bed silent enable flag and the object silent enable flag.

In a possible implementation, the silent flag information includes the silent enable flag; and

- the silent enable flag indicates whether a silent flag detection function is enabled; or
- the silent enable flag indicates whether a silent flag of each channel of the multi-channel signal needs to be sent; or
- the silent enable flag indicates whether each channel of the multi-channel signal is a non-silent channel.

In the foregoing solution, the silent enable flag indicates whether the silent detection function is enabled. For example, when the silent enable flag is a first value (for example, 1), it indicates that the silent detection function is enabled, and the silent flag of each channel of the multi-channel signal is further detected. When the silent enable flag is a second value (for example, 0), it indicates that the silent detection function is disabled.

In the foregoing solution, the silent enable flag may alternatively indicate whether each channel of the multi-channel signal is a non-silent channel. For example, when the silent enable flag is a first value (for example, 1), it indicates that the silent flag of each channel needs to be further detected. When the silent enable flag is a second value (for example, 0), it indicates that each channel of the multi-channel signal is a non-silent channel.

In a possible implementation, the obtaining silent flag information of a multi-channel signal includes:

- obtaining the silent flag information based on control signaling input to an encoding device; or
- obtaining the silent flag information based on an encoding parameter of an encoding device; or
- performing silent flag detection on each channel of the multi-channel signal to obtain the silent flag information.

In the foregoing solution, the control signaling may be input to the encoding device, and the silent flag information is determined based on the control signaling. The silent flag information may be controlled by an external input. Alternatively, the encoding device includes the encoding parameter (also referred to as an encoder parameter), and the encoding parameter may be used to determine the silent flag information. The silent flag information may be preset based on the encoder parameter such as an encoding rate or encoding bandwidth. Alternatively, the silent flag information may be determined based on a silent detection result of each channel. An implementation of the silent flag information is not limited in this embodiment of this application.

In a possible implementation, the silent flag information includes the silent enable flag and the silent flag; and

- the performing silent flag detection on each channel of the multi-channel signal to obtain the silent flag information includes:
- performing silent flag detection on each channel of the multi-channel signal to obtain the silent flag of each channel; and
- determining the silent enable flag based on the silent flag of each channel.

In the foregoing solution, an encoder side may first detect the silent flag of each channel, where the silent flag of each channel indicates whether the channel is a silent frame. After the silent flag of each channel is determined, the silent enable flag is determined based on the silent flag of each channel. The silent enable flag can be generated in the foregoing manner, so that the silent flag information can be generated.

In a possible implementation, the silent flag information includes the silent flag, or the silent flag information includes the silent enable flag and the silent flag; and

- the silent flag indicates whether each channel on which the silent enable flag acts is a silent channel, and the silent channel is a channel that does not need to be encoded or a channel that needs to be encoded at a low bit rate.

In the foregoing solution, when a value of the silent flag is a first value (for example, 1), it indicates that the channel on which the silent enable flag acts is a silent channel; or when a value of the silent flag is a second value (for example, 0), it indicates that the channel on which the silent enable flag acts is a non-silent channel. When the value of the silent flag is the first value (for example, 1), the channel is not encoded or is encoded at a low bit rate.

In a possible implementation, before the obtaining silent flag information of a multi-channel signal, the method further includes:

- preprocessing the multi-channel signal to obtain a preprocessed multi-channel signal, where the preprocessing includes at least one of the following: transient state detection, window type determining, time-frequency transform, frequency-domain noise shaping, temporal noise shaping, and bandwidth extension encoding; and
- the obtaining silent flag information of a multi-channel signal includes:
- performing silent flag detection on the preprocessed multi-channel signal to obtain the silent flag information.

In the foregoing solution, through the foregoing preprocessing process, encoding efficiency of the multi-channel signal can be improved.

In a possible implementation, the method further includes:

- preprocessing the multi-channel signal to obtain a preprocessed multi-channel signal, where the preprocessing includes at least one of the following: transient state detection, window type determining, time-frequency transform, frequency-domain noise shaping, temporal noise shaping, and bandwidth extension encoding; and
- correcting the silent flag information based on the preprocessed multi-channel signal.

In the foregoing solution, after preprocessing, the silent flag information may be further corrected based on a preprocessing result. For example, after frequency-domain noise shaping, if energy of a channel of the multi-channel signal changes, a silent flag detection result of the channel may be adjusted, to correct the silent flag information.

In a possible implementation, the generating a bitstream based on the transmission channel signal of each transmission channel and the silent flag information includes:

- adjusting an initial multi-channel processing manner based on the silent flag information to obtain an adjusted multi-channel processing manner; and
- encoding the multi-channel signal in the adjusted multi-channel processing manner to obtain the bitstream.

In the foregoing solution, the encoder side may adjust the initial multi-channel processing manner based on the silent flag information, and then encode the multi-channel signal in the adjusted multi-channel processing manner. This can improve encoding efficiency. For example, in a multi-channel signal screening process, a channel whose silent flag is 1 does not participate in pairing screening.

In a possible implementation, the generating a bitstream based on the transmission channel signal of each transmission channel and the silent flag information includes:

performing bit allocation for each transmission channel based on the silent flag information, a quantity of available bits, and multi-channel side information to obtain a bit allocation result of each transmission channel; and encoding the transmission channel signal of each transmission channel based on the bit allocation result of the channel to obtain the bitstream.

In the foregoing solution, the encoder side performs bit allocation based on the silent flag information, the quantity of available bits, and the multi-channel side information; and performs encoding based on the bit allocation result of each transmission channel to obtain the encoded bitstream. Specific content of a bit allocation strategy is not limited. For example, encoding on the transmission channel signal may be multi-channel quantization and encoding. In this embodiment of this application, specific implementation of multi-channel quantization and encoding may be that a signal obtained after pairing and downmixing is changed through a neural network to obtain a potential feature; and the potential feature is quantized, and range encoding is performed. The specific implementation of multi-channel quantization and encoding may be that quantization and encoding are performed, based on vector quantization, on a signal obtained after pairing and downmixing.

In a possible implementation, the performing bit allocation for each transmission channel based on the silent flag information, a quantity of available bits, and multi-channel side information includes:

performing bit allocation for each transmission channel based on the quantity of available bits and the multi-channel side information according to a bit allocation strategy corresponding to the silent flag information.

In the foregoing solution, performing bit allocation based on the silent flag information may be as follows: Initial bit allocation is first performed based on the total quantity of available bits and a signal feature of each transmission channel with reference to the bit allocation strategy. Then, a bit allocation result is adjusted based on the silent flag information. Bit allocation adjustment can improve transmission efficiency of the multi-channel signal.

In a possible implementation, the multi-channel side information includes a channel bit allocation ratio field.

The channel bit allocation ratio field indicates a bit allocation ratio between non-low frequency effect LFE channels in the multi-channel signal.

In the foregoing solution, a bit allocation ratio of all channels other than an LFE channel in the multi-channel signal can be indicated by using the channel bit allocation ratio field, to determine a quantity of bits of each non-LFE channel.

In a possible implementation, the performing silent flag detection on each channel of the multi-channel signal includes:

determining signal energy of each channel of a current frame of the multi-channel signal based on an input signal of the channel of the current frame;

determining a silent detection parameter of each channel of the current frame based on the signal energy of the channel of the current frame; and determining a silent flag of each channel of the current frame based on the silent detection parameter of the channel of the current frame and a preset silent detection threshold.

In the foregoing solution, the silent detection parameter of each channel of the current frame is compared with the silent detection threshold. Using silent flag detection on a first channel of the current frame as an example, if a silent detection parameter of the first channel of the current frame is less than the silent detection threshold, the first channel of the current frame is a silent frame, that is, the first channel is a silent channel at a current moment, and a silent flag muteFlag[1] of the first channel of the current frame is the first value (for example, 1). If a silent detection parameter of the first channel of the current frame is greater than or equal to the silent detection threshold, the first channel of the current frame is a non-silent frame, that is, the first channel is a non-silent channel at a current moment, and a silent flag muteFlag[1] of the first channel of the current frame has the second value (for example, 0).

In a possible implementation, the performing multi-channel encoding processing on the multi-channel signal to obtain a transmission channel signal of each transmission channel includes:

performing multi-channel signal screening on the multi-channel signal to obtain a screened multi-channel signal;

performing pairing processing on the screened multi-channel signal to obtain a multi-channel paired signal and the multi-channel side information; and performing downmixing processing on the multi-channel paired signal based on the multi-channel side information to obtain the transmission channel signal of each transmission channel.

In the foregoing solution, the encoding device screens the multi-channel signal, for example, screens out a multi-channel signal that does not participate in multi-channel pairing, to obtain the screened multi-channel signal. The screened multi-channel signal may be a multi-channel signal that participates in multi-channel pairing. For example, a screened channel does not include an LFE channel. After the multi-channel signal is screened, the multi-channel signal may be further paired, for example, ch1 and ch2 form one channel pair, to obtain a multi-channel paired signal. After the multi-channel paired signal is generated, downmixing processing is performed. A specific downmixing process is not described in detail, and the transmission channel signal of each transmission channel can be obtained. In this embodiment of this application, the transmission channel may be a channel after multi-channel pairing and downmixing.

In a possible implementation, the multi-channel side information includes at least one of the following: a quantized codebook index of an interaural level difference parameter, a quantity of channel pairs, and a channel pair index.

The quantized codebook index of the interaural level difference parameter indicates a quantized codebook index of an interaural level difference ILD parameter of each channel in all channels of the multi-channel signal.

The quantity of channel pairs indicates a quantity of channel pairs of the current frame of the multi-channel signal.

The channel pair index indicates an index of a channel pair.

In the foregoing solution, a quantity of bits occupied by the quantized codebook index of the interaural level difference parameter is not limited in this embodiment of this application. For example, the quantized codebook index of the interaural level difference parameter occupies 5 bits. The quantized codebook index of the interaural level difference parameter may be represented as mcIld[ch1] or mcIld[ch2], and occupies 5 bits. A quantized codebook index of an interaural level difference ILD parameter of each channel in a current channel pair is used to restore a level of a decoding spectrum. A quantity of bits occupied by the quantity of channel pairs is not limited in this embodiment of this application. For example, the quantity of channel pairs occupies 4 bits. The quantity of channel pairs is represented as pairCnt, occupies 4 bits, and indicates the quantity of channel pairs of the current frame. A quantity of bits occupied by the channel pair index is not limited in this embodiment of this application. For example, the channel pair index is represented as channelPairIndex. A quantity of bits of channelPairIndex is related to a total quantity of channels, and channelPairIndex represents an index of a channel pair. Index values, that is, ch1 and ch2, of two channels in a current channel pair may be obtained through parsing.

According to a second aspect, an embodiment of this application provides a multi-channel signal decoding method, including:

- parsing a bitstream from an encoding device to obtain silent flag information, and determining encoded information of each transmission channel based on the silent flag information, where the silent flag information includes a silent enable flag and/or a silent flag;
- decoding the encoded information of each transmission channel to obtain a decoded signal of each transmission channel; and
- performing multi-channel decoding processing on the decoded signal of each transmission channel to obtain a multi-channel decoding output signal.

In the foregoing solution, in this embodiment of this application, a decoder side may obtain the silent flag information from the bitstream from an encoder side, so that the decoder side performs decoding processing in a manner consistent with that on the encoder side.

In a possible implementation, the parsing a bitstream from an encoding device to obtain silent flag information includes:

- parsing the bitstream to obtain a silent flag of each channel; or
- parsing the bitstream to obtain the silent enable flag, and if the silent enable flag is a first value, parsing the bitstream to obtain the silent flag; or
- parsing the bitstream to obtain a sound bed silent enable flag and/or an object silent enable flag and a silent flag of each channel; or
- parsing the bitstream to obtain a sound bed silent enable flag and/or an object silent enable flag, and parsing the bitstream to obtain silent flags of a part of channels in all channels based on the sound bed silent enable flag and/or the object silent enable flag.

In the foregoing solution, the decoder side parses the bitstream from the encoding device to obtain the silent flag information. Based on different specific content of the silent flag information generated by the encoding device, the silent flag information obtained by the decoder side corresponds to that on the encoder side. Specifically, in a manner, the silent flag indicates whether each channel is a silent channel, and the silent channel is a channel that does not need to be encoded or a channel that needs to be encoded at a low bit rate. The decoder side may parse the bitstream to obtain the silent flag of each channel. In a manner, the silent enable flag may alternatively indicate whether each channel is a non-silent channel. For example, when the silent enable flag is a first value (for example, 1), it indicates that the silent flag of each channel needs to be further detected. When the silent enable flag is a second value (for example, 0), it indicates that each channel is a non-silent channel. The decoder side parses the bitstream to obtain the silent enable flag, and if the silent enable flag is the first value, parses the bitstream to obtain the silent flag. In a manner, the silent enable flag includes the sound bed silent enable flag and/or the object silent enable flag. The decoder side parses the bitstream to obtain the sound bed silent enable flag and/or the object silent enable flag and the silent flag of each channel. In a manner, the decoder side parses the bitstream to obtain the sound bed silent enable flag and/or the object silent enable flag, and parses the bitstream to obtain the silent flags of the part of channels based on the sound bed silent enable flag and/or the object silent enable flag.

In a possible implementation, the decoding the encoded information of each transmission channel includes:

- parsing the bitstream to obtain multi-channel side information;
- performing bit allocation for each transmission channel based on the multi-channel side information and the silent flag information to obtain a quantity of encoding bits of each channel; and
- decoding the encoded information of each transmission channel based on the quantity of encoding bits of each channel.

In the foregoing solution, the bitstream may further include the multi-channel side information. The decoder side may perform bit allocation for each transmission channel based on the multi-channel side information and the silent flag information, to obtain the quantity of encoding bits of each transmission channel. The quantity of encoding bits obtained by the decoder side is the same as a preset quantity of encoding bits on the encoder side. Then, the encoded information of each transmission channel is decoded based on the quantity of encoding bits of each transmission channel, to decode a transmission channel signal of each transmission channel.

In a possible implementation, after the performing multi-channel decoding processing on the decoded signal of each transmission channel to obtain a multi-channel decoding output signal, the method further includes:

- post-processing the multi-channel decoding output signal, where the post-processing includes at least one of the following: bandwidth extension decoding, inverse temporal noise shaping, inverse frequency-domain noise shaping, and inverse time-frequency transform.

In the foregoing solution, the foregoing process of post-processing the multi-channel decoding output signal is inverse to a preprocessing process on the encoder side, and a specific processing manner is not limited.

In a possible implementation, the multi-channel side information includes at least one of the following: a quantized codebook index of an interaural level difference parameter, a quantity of channel pairs, and a channel pair index.

The quantized codebook index of the interaural level difference parameter indicates a quantized codebook index of an interaural level difference ILD parameter of each channel in all channels.

The quantity of channel pairs indicates a quantity of channel pairs of the current frame of the multi-channel signal.

The channel pair index indicates an index of a channel pair.

According to a third aspect, an embodiment of this application provides an encoding device. The encoding device includes:

a silent flag detection module, configured to obtain silent flag information of a multi-channel signal, where the silent flag information includes a silent enable flag and/or a silent flag;

a multi-channel encoding module, configured to perform multi-channel encoding processing on the multi-channel signal to obtain a transmission channel signal of each transmission channel; and a bitstream generation module, configured to generate a bitstream based on the transmission channel signal of each transmission channel and the silent flag information, where the bitstream includes the silent flag information and a multi-channel quantization and encoding result of the transmission channel signal.

According to a fourth aspect, an embodiment of this application provides a decoding device. The decoding device includes:

a parsing module, configured to parse a bitstream from an encoding device to obtain silent flag information, and determine encoded information of each transmission channel based on the silent flag information, where the silent flag information includes a silent enable flag and/or a silent flag;

a dequantization module, configured to decode the encoded information of each transmission channel to obtain a decoded signal of each transmission channel; and a multi-channel decoding module, configured to perform multi-channel decoding processing on the decoded signal of each transmission channel to obtain a multi-channel decoding output signal.

According to a fifth aspect, an embodiment of this application provides a computer-readable storage medium. The computer-readable storage medium stores instructions, and when the instructions are run on a computer, the computer is enabled to perform the method according to the first aspect or the second aspect.

According to a sixth aspect, an embodiment of this application provides a computer program product including instructions. When the computer program product runs on a computer, the computer is enabled to perform the method according to the first aspect or the second aspect.

According to a seventh aspect, an embodiment of this application provides a communication apparatus. The communication apparatus may include an entity such as a terminal device or a chip. The communication apparatus includes a processor and a memory. The memory is configured to store instructions. The processor is configured to execute the instructions in the memory, so that the communication apparatus performs the method according to either the first aspect or the second aspect.

According to an eighth aspect, an embodiment of this application provides a computer-readable storage medium. The computer-readable storage medium stores a bitstream generated by using the method in the first aspect.

According to a ninth aspect, this application provides a chip system. The chip system includes a processor, configured to support a coding device in implementing the function in the foregoing aspect, for example, sending or processing data and/or information in the foregoing method. In a possible design, the chip system further includes a memory. The memory is configured to store program instructions and data necessary for the coding device. The chip system may include a chip, or may include a chip and another discrete component.

DESCRIPTION OF EMBODIMENTS

Figure 1:
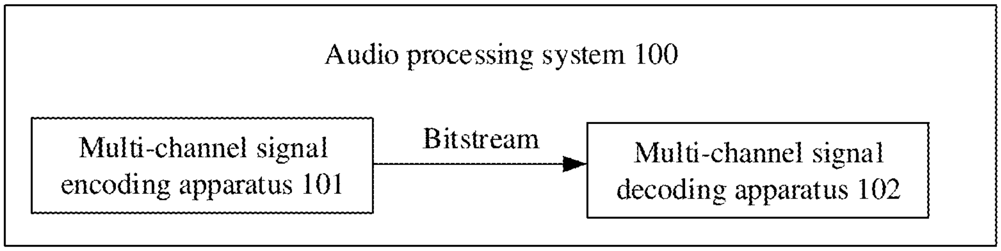
FIG. 1 is a diagram of a composition structure of a multi-channel signal processing system according to an embodiment of this application.

Embodiments of this application provide a multi-channel signal encoding method, a multi-channel signal decoding method, an encoding device, and a decoding device, to improve encoding efficiency and encoding bit resource utilization.

The following describes embodiments of this application with reference to the accompanying drawings.

In the specification, claims, and accompanying drawings of this application, terms "first", "second", and the like are intended to distinguish between similar objects but do not necessarily indicate a specific order or sequence. It should be understood that the terms used in such a way are interchangeable in proper circumstances. This is merely a discrimination manner that is used when objects having a same attribute are described in embodiments of this application. In addition, the terms "include", "have", and any variants thereof are intended to cover non-exclusive inclusion, so that a process, method, system, product, or device including a series of units is not necessarily limited to those units, but may include other units that are not clearly listed or are inherent to the process, method, product, or device.

A sound (sound) is a continuous wave generated by vibration of an object. The object that vibrates and emits the sound wave is referred to as a sound source. In a process in which the sound wave is propagated through a medium (for example, air, solid, or liquid), an auditory organ of a human or an animal can sense the sound.

Features of the sound wave include a tone, intensity, and a timbre. The tone indicates a level of the sound. The intensity indicates volume of the sound. The intensity may also be referred to as loudness or volume. A unit of the intensity is decibel (dB). The timbre is also referred to as sound quality.

A frequency of the sound wave determines the level of the tone. A higher frequency indicates a higher tone. A quantity of times of vibration of the object within 1 second is referred to as the frequency. A unit of the frequency is hertz (Hz). A frequency of a sound that can be recognized by a human ear is between 20 Hz and 20000 Hz.

An amplitude of the sound wave determines the intensity. A larger amplitude indicates higher intensity. A shorter distance from the sound source indicates higher intensity.

A waveform of the sound wave determines the timbre. Waveforms of sound waves include a square wave, a sawtooth wave, a sine wave, a pulse wave, and the like.

Based on features of sound waves, sounds may be classified into a regular sound and an irregular sound. The irregular sound is a sound emitted by a sound source that vibrates irregularly. The irregular sound is, for example, noise that affects people's work, study, rest, and the like. The regular sound is a sound emitted by a sound source that vibrates regularly. Regular sounds include a voice and a music sound. When a sound is represented electrically, the regular sound is an analog signal that changes continuously in time-frequency domain. The analog signal may be referred to as an audio signal (acoustic signals). The audio signal is an information carrier that carries a voice, music, and sound effects.

Because human's auditory sense has a capability of distinguishing location distribution of a sound source in space, when hearing a sound in space, a listener can sense a direction and a location of the sound in addition to a tone, intensity, and a timbre of the sound.

Sounds may be further classified as mono and stereo. Mono means that there is one sound channel, one microphone is used to pick up a sound, and one speaker is used to play the sound. Stereo means that there are a plurality of sound channels, and different sound channels transmit different sound waveforms. After multi-channel encoding is performed on the multi-channel signal, a transmission channel signal of each transmission channel may be obtained. The transmission channel is a channel after the multi-channel encoding. Further, the multi-channel encoding may include channel pairing and downmixing processing. Therefore, the transmission channel may also be referred to as a channel after channel pairing and downmixing. For details, refer to descriptions of a multi-channel encoding process in the following embodiments.

Embodiments of this application are applied to the field of audio encoding and decoding, especially multi-channel encoding. The multi-channel encoding may be encoding a sound bed signal having a plurality of channels, for example, 5.1 channels, 5.1.4 channels, 7.1 channels, 7.1.4 channels, and 22.2 channels. The multi-channel encoding may alternatively be encoding a plurality of object audio signals. Alternatively, multi-channel encoding may be encoding a mixed signal including both a sound bed signal and/or an object audio signal.

The 5.1 channels include a center channel (C), a front left channel (L), a front right channel (R), a rear left surround channel (LS), a rear right surround channel (RS), and a 0.1 (LFE) channel.

The 5.1.4 channels include the following channels in addition to the 5.1 channels: a left height channel, a right height channel, a left height surround channel, and a right height surround channel.

The 7.1 channels include a center channel (C), a front left channel (L), a front right channel (R), a rear left surround channel (LS), a rear right surround channel (RS), a rear left channel (LB), a rear right channel (RB), and a 0.1 channel LFE channel.

The 7.1.4 channels include four height channels in addition to the 7.1 channels.

The 22.2 channels are in a multi-channel format, and include a total of 22 channels at three layers and two LFE channels.

The mixed signal of the sound bed signal and the object signal is a signal combination in three-dimensional audio, and is used to jointly complete audio recording, transmission, and replay requirements in complex scenarios such as film production, sports games, and concerts. For example, sound content in a stadium in a sports game broadcast is usually represented by a sound bed signal, and comments of different commentators are usually represented by a plurality of pieces of object audio. Regardless of the sound bed signal, the object signal, or the mixed signal including the sound bed signal and the object audio signal, features of input signals on different channels are not completely the same at a same moment, and a feature of an input signal on a same channel also changes continuously at different moments.

Currently, a fixed encoding scheme is used for a multi-channel signal, and a difference between features of input signals at different moments and/or on different channels is not considered. For example, a unified bit allocation scheme is used for processing, and quantization and encoding are performed on the multi-channel signal based on a bit allocation result.

Using a same bit allocation scheme cannot adapt to a change of features of input signals on different channels at different moments, and encoding efficiency is low. For example, a to-be-encoded multi-channel audio signal includes a 5.1.4-channel sound bed signal and four object signals. In 14 to-be-encoded channels, channels 0 to 9 belong to the sound bed signal, and channels 10 to 13 belong to the object signals. At a specific moment, channels 6 to 9 and channels 11, 12, and 13 are silent channels (little information can be sensed by an auditory sense), and the other channels include main audio information, that is, are non-silent channels. At another moment, channels 10, 12, and 13 become silent channels, and the other channels include the main audio information.

If a same bit allocation scheme is used at different moments, some channels that include the main audio information may not have enough bits for encoding, but some silent channels are allocated with excessive encoding bits, causing a waste of encoding bit resources.

Embodiments of this application provide an audio processing technology, and in particular, provide an audio encoding technology oriented to a multi-channel signal, to improve a conventional audio encoding system. The multi-channel signal is an audio signal including a plurality of channels. For example, the multi-channel signal may be a stereo signal. Audio processing includes two parts: audio encoding and audio decoding. Audio encoding is performed on a source side, and includes encoding (for example, compressing) original audio to reduce an amount of data required for representing the audio, to achieve more efficient storage and/or transmission. Audio decoding is performed on a destination side, and includes inverse processing relative to an encoder, to reconstruct the original audio. The encoding part and the decoding part are also collectively referred to as coding. The following describes implementations of embodiments of this application in detail with reference to the accompanying drawings.

The technical solutions in embodiments of this application may be applied to various audio processing systems. FIG. 1 is a diagram of a composition structure of an audio processing system according to an embodiment of this application. The audio processing system 100 may include a multi-channel signal encoding apparatus 101 and a multi-channel signal decoding apparatus 102. The multi-channel signal encoding apparatus 101 may also be referred to as an audio encoding apparatus, and may be configured to generate a bitstream. Then, the encoded audio bitstream may be transmitted to the multi-channel signal decoding apparatus 102 through an audio transmission channel. The multi-channel signal decoding apparatus 102 may also be referred to as an audio decoding apparatus, and may receive the bitstream, and then perform an audio decoding function of the multi-channel signal decoding apparatus 102, to finally obtain a reconstructed signal.

In this embodiment of this application, the multi-channel signal encoding apparatus may be used in various terminal devices that require audio communication and wireless devices and core network devices that require transcoding. For example, the multi-channel signal encoding apparatus may be an audio encoder of the terminal device, the wireless device, or the core network device. Similarly, the multi-channel signal decoding apparatus may be used in various terminal devices that require audio communication and wireless devices and core network devices that require transcoding. For example, the multi-channel signal decoding apparatus may be an audio decoder of the terminal device, the wireless device, or the core network device. For example, the audio encoder may include a media gateway, a transcoding device, a media resource server, a mobile terminal, a fixed network terminal, or the like in a radio access network or a core network. The audio encoder may alternatively be an audio encoder used for a virtual reality (VR) streaming service.

In embodiments of this application, an audio coding module (audio encoding and audio decoding) applicable to a virtual reality streaming (VR streaming) service is used as an example. An end-to-end encoding and decoding procedure for an audio signal includes the following: A preprocessing operation (audioPReprocessing) is performed on an audio signal A after the audio signal A passes through an acquisition module (acquisition). The preprocessing operation includes filtering out a low frequency part of the signal. Direction and location information in the signal may be extracted by using 20 Hz or 50 Hz as a boundary point, then encoding processing (audio encoding) and encapsulation (file/segment encapsulation) are performed, and then the signal is delivered to a decoder side. The decoder side first performs decapsulation (file/segment decapsulation), then performs decoding, and performs binaural rendering processing on a decoded signal. A rendered signal is mapped to headphones of a listener. The headphones may be independent headphones or headphones on a glasses device.

Figure 2A:
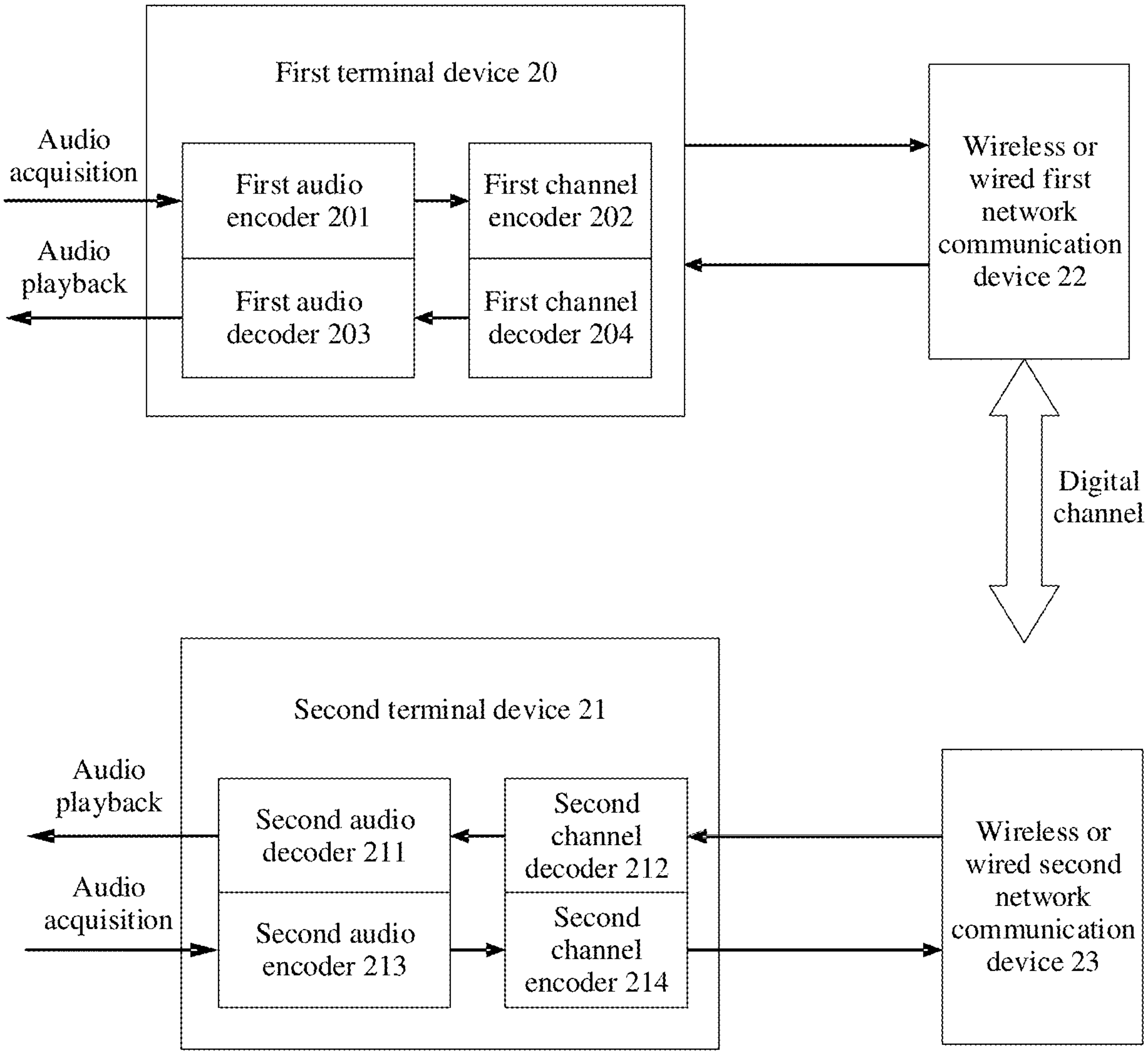
FIG. 2*a* is a diagram in which an audio encoder and an audio decoder are used in a terminal device according to an embodiment of this application.

FIG. 2*a* is a diagram in which an audio encoder and an audio decoder are used in a terminal device according to an embodiment of this application. Each terminal device may include an audio encoder, a channel encoder, an audio decoder, and a channel decoder. Specifically, the channel encoder is configured to perform channel encoding on an audio signal, and the channel decoder is configured to perform channel decoding on an audio signal. For example, a first terminal device 20 may include a first audio encoder 201, a first channel encoder 202, a first audio decoder 203, and a first channel decoder 204. A second terminal device 21 may include a second audio decoder 211, a second channel decoder 212, a second audio encoder 213, and a second channel encoder 214. The first terminal device 20 is connected to a wireless or wired first network communication device 22, the first network communication device 22 is connected to a wireless or wired second network communication device 23 through a digital channel, and the second terminal device 21 is connected to the wireless or wired second network communication device 23. The wireless or wired network communication device may be a signal transmission device in general, for example, a communication base station or a data exchange device.

In audio communication, a terminal device serving as a transmitting end first acquires audio, performs audio encoding on an acquired audio signal, then performs channel encoding, and performs transmission on a digital channel by using a wireless network or a core network. A terminal device serving as a receiving end performs channel decoding based on a received signal to obtain a bitstream, and then restores the audio signal through audio decoding. The terminal device at the receiving end performs audio playback.

Figure 2B:
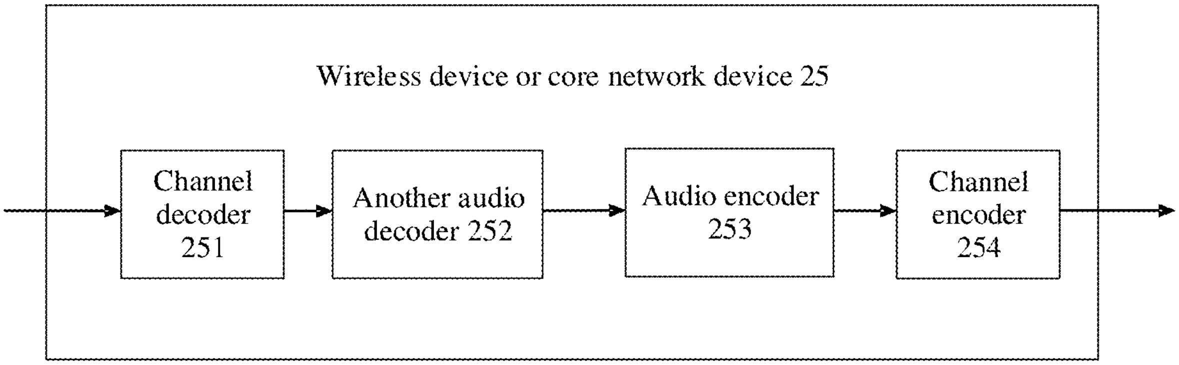
FIG. 2*b* is a diagram in which an audio encoder is used in a wireless device or a core network device according to an embodiment of this application.

FIG. 2*b* is a diagram in which an audio encoder is used in a wireless device or a core network device according to an embodiment of this application. A wireless device or a core network device 25 includes a channel decoder 251, another audio decoder 252, an audio encoder 253 provided in this embodiment of this application, and a channel encoder 254. The another audio decoder 252 is another audio decoder other than the audio decoder. In the wireless device or the core network device 25, channel decoding is first performed, by using the channel decoder 251, on a signal that enters the device, then audio decoding is performed by using the another audio decoder 252, then audio encoding is performed by using the audio encoder 253 provided in this embodiment of this application, and finally channel encoding is performed on the audio signal by using the channel encoder 254. After channel encoding is completed, the audio signal is transmitted. The another audio decoder 252 performs audio decoding on a bitstream decoded by the channel decoder 251.

Figure 2C:
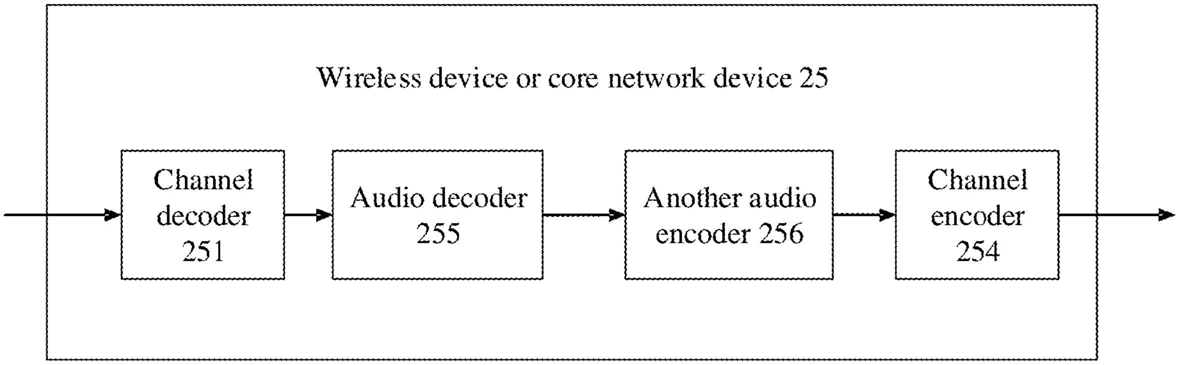
FIG. 2*c* is a diagram in which an audio decoder is used in a wireless device or a core network device according to an embodiment of this application.

FIG. 2*c* is a diagram in which an audio decoder is used in a wireless device or a core network device according to an embodiment of this application. A wireless device or a core network device 25 includes a channel decoder 251, an audio decoder 255 provided in this embodiment of this application, another audio encoder 256, and a channel encoder 254. The another audio encoder 256 is another audio encoder other than the audio encoder. In the wireless device or the core network device 25, channel decoding is first performed, by using the channel decoder 251, on a signal that enters the device, then a received encoded audio bitstream is decoded by using the audio decoder 255, then audio encoding is performed by using the another audio encoder 256, and finally channel encoding is performed on the audio signal by using the channel encoder 254. After channel encoding is completed, the audio signal is transmitted. In the wireless device or the core network device, if transcoding needs to be implemented, corresponding audio encoding processing needs to be performed. The wireless device is a radio frequency-related device in communication, and the core network device is a core network-related device in communication.

In some embodiments of this application, the multi-channel signal encoding apparatus may be used in various terminal devices that require audio communication and wireless devices and core network devices that require transcoding. For example, the multi-channel signal encoding apparatus may be a multi-channel encoder of the terminal device, the wireless device, or the core network device. Similarly, the multi-channel signal decoding apparatus may be used in various terminal devices that require audio communication and wireless devices and core network devices that require transcoding. For example, the multi-channel signal decoding apparatus may be a multi-channel decoder of the terminal device, the wireless device, or the core network device.

Figure 3A:
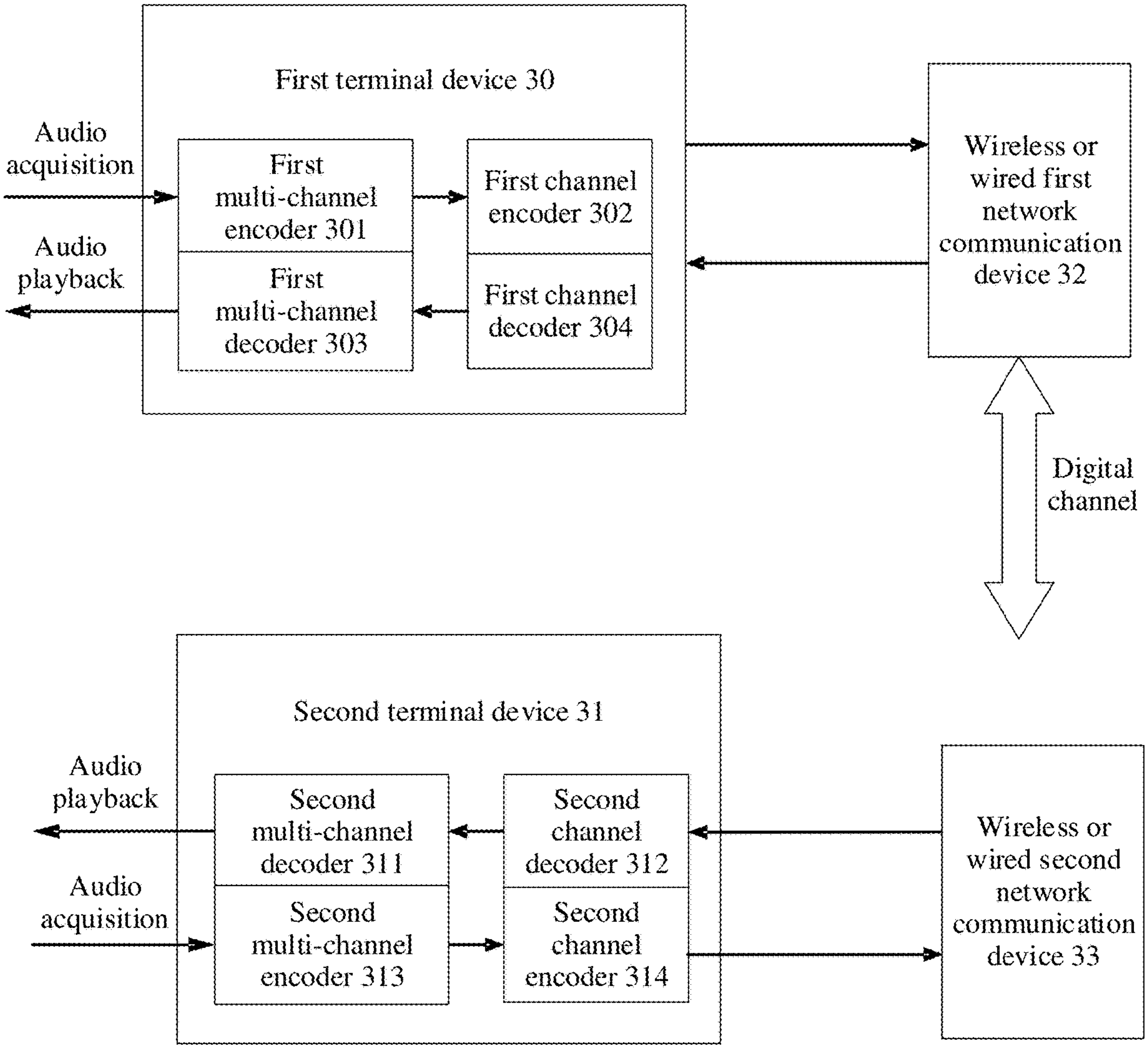
FIG. 3*a* is a diagram in which a multi-channel encoder and a multi-channel decoder are used in a terminal device according to an embodiment of this application.

FIG. 3*a* is a diagram in which a multi-channel encoder and a multi-channel decoder are used in a terminal device according to an embodiment of this application. Each terminal device may include a multi-channel encoder, a channel encoder, a multi-channel decoder, and a channel decoder. The multi-channel encoder may perform an audio encoding method provided in embodiments of this application, and the multi-channel decoder may perform an audio decoding method provided in embodiments of this application. Specifically, the channel encoder is configured to perform channel encoding on a multi-channel signal, and the channel decoder is configured to perform channel decoding on a multi-channel signal. For example, a first terminal device 30 may include a first multi-channel encoder 301, a first channel encoder 302, a first multi-channel decoder 303, and a first channel decoder 304. A second terminal device 31 may include a second multi-channel decoder 311, a second channel decoder 312, a second multi-channel encoder 313, and a second channel encoder 314. The first terminal device 30 is connected to a wireless or wired first network communication device 32, the first network communication device 32 is connected to a wireless or wired second network communication device 33 through a digital channel, and the second terminal device 31 is connected to the wireless or wired second network communication device 33. The wireless or wired network communication device may be a signal transmission device in general, for example, a communication base station or a data exchange device. In audio communication, a terminal device serving as a transmitting end performs multi-channel encoding on an acquired multi-channel signal, then performs channel encoding, and performs transmission on a digital channel by using a wireless network or a core network. A terminal device serving as a receiving end performs channel decoding based on a received signal to obtain a multi-channel signal encoded bitstream, and then restores the multi-channel signal through multi-channel decoding. The terminal device serving as the receiving end performs playback.

Figure 3B:
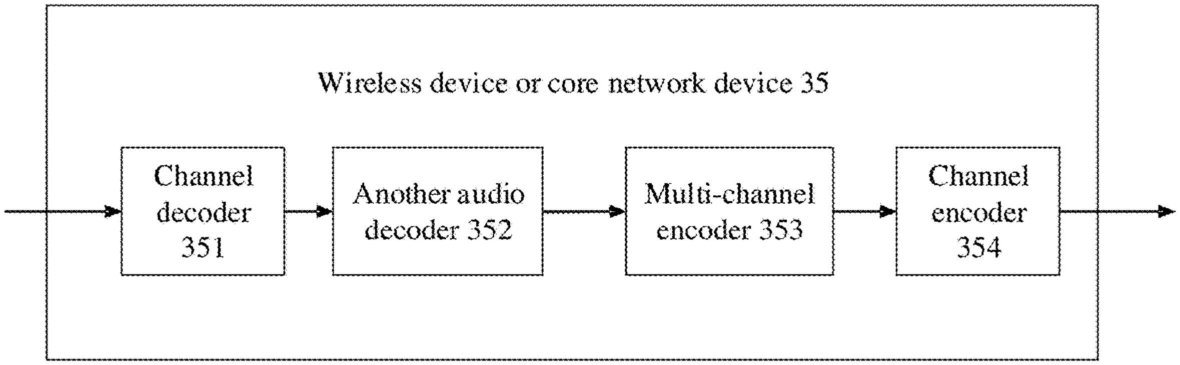
FIG. 3*b* is a diagram in which a multi-channel encoder is used in a wireless device or a core network device according to an embodiment of this application.

FIG. 3*b* is a diagram in which a multi-channel encoder is used in a wireless device or a core network device according to an embodiment of this application. A wireless device or a core network device 35 includes a channel decoder 351, another audio decoder 352, a multi-channel encoder 353, and a channel encoder 354. FIG. 3*b* is similar to FIG. 2*b*, and details are not described herein again.

Figure 3C:
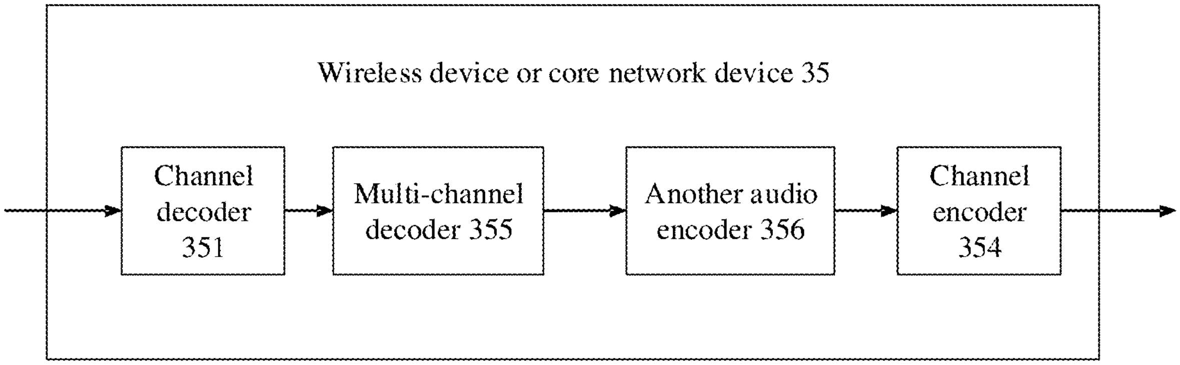
FIG. 3*c* is a diagram in which a multi-channel decoder is used in a wireless device or a core network device according to an embodiment of this application.

FIG. 3*c* is a diagram in which a multi-channel decoder is used in a wireless device or a core network device according to an embodiment of this application. A wireless device or a core network device 35 includes a channel decoder 351, a multi-channel decoder 355, another audio encoder 356, and a channel encoder 354. FIG. 3*c* is similar to FIG. 2*c*, and details are not described herein again.

Audio encoding processing may be a part of a multi-channel encoder, and audio decoding processing may be a part of a multi-channel decoder. For example, performing multi-channel encoding on an acquired multi-channel signal may be processing the acquired multi-channel signal to obtain an audio signal, and then encoding the obtained audio signal according to the method provided in embodiments of this application. A decoder side decodes a multi-channel signal encoded bitstream to obtain the audio signal, and restores the multi-channel signal through upmixing processing. Therefore, embodiments of this application may also be applied to a multi-channel encoder and a multi-channel decoder in a terminal device, a wireless device, or a core network device. In the wireless device or the core network device, if transcoding needs to be implemented, corresponding multi-channel encoding processing needs to be performed.

Figure 4:
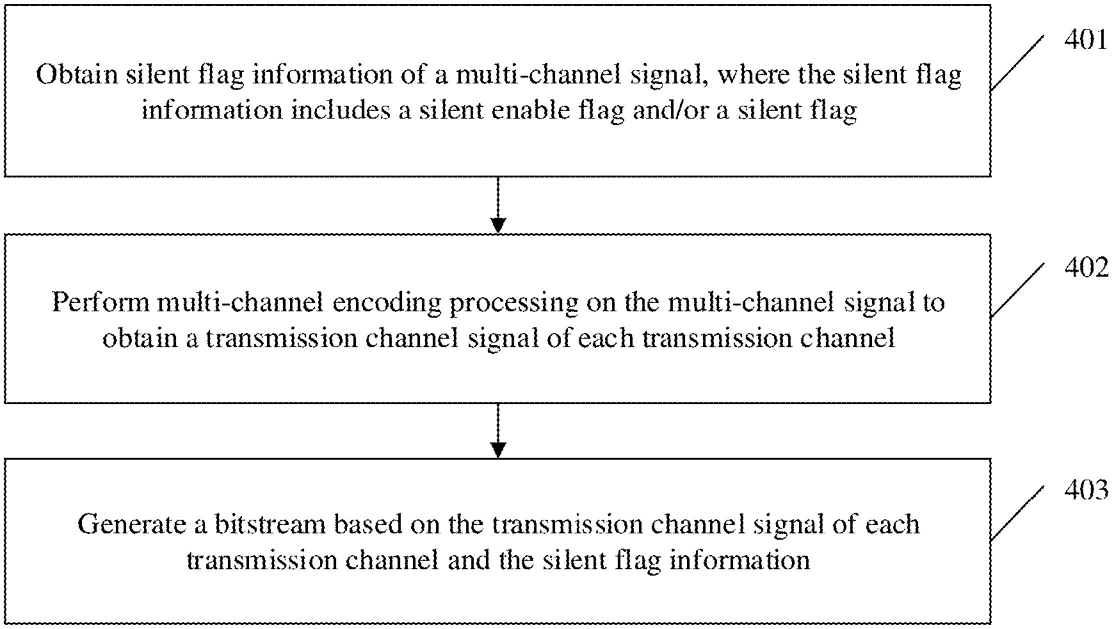
FIG. 4 is a diagram of a multi-channel signal encoding method according to an embodiment of this application.

First, a multi-channel signal encoding method provided in embodiments of this application is described. The method may be performed by a terminal device. For example, the terminal device may be a multi-channel signal encoding apparatus (which is briefly referred to as an encoder side, an encoder, or an encoding device below, where the encoder side may be, for example, an artificial intelligence (AI) encoder). In embodiments of this application, a multi-channel signal may include a plurality of sound channels, for example, a first channel and a second channel. Alternatively, the plurality of channels may include a first channel, a second channel, a third channel, and the like. As shown in FIG. 4, an encoding procedure performed by an encoding device (or referred to as an encoder side) in an embodiment of this application is described.

401: Obtain silent flag information of a multi-channel signal, where the silent flag information includes a silent enable flag and/or a silent flag.

In this embodiment of this application, after the multi-channel signal is input, the encoder side may obtain the silent flag information of the multi-channel signal. The silent flag information may indicate a silent status of a channel in the multi-channel signal. For example, silent flag detection is performed on the multi-channel signal to detect whether the multi-channel signal supports the silent flag, and the encoder side may generate the silent flag information based on the multi-channel signal. The silent flag information may be used to guide subsequent encoding processing, for example, bit allocation. The silent flag information may be further written into a bitstream by the encoder side and transmitted to a decoder side, to ensure consistency of encoding processing and decoding processing.

In this embodiment of this application, the silent flag information indicates the silent flag of the multi-channel signal. The silent flag information has a plurality of implementations. For example, the silent flag information may include the silent enable flag and/or the silent flag. The silent enable flag indicates whether silent detection is enabled, and the silent flag indicates whether each channel of the multi-channel signal is a silent frame.

In some embodiments of this application, the multi-channel signal includes a sound bed signal and/or an object signal. In a current encoding scheme, a difference between features of input signals at different moments and/or on different channels is not considered, and the unified encoding scheme is used for processing, resulting in low encoding efficiency. Silent indication can be performed for the sound bed signal and/or the object signal by using the silent enable flag provided in this embodiment of this application. Specifically, the silent flag information includes the silent enable flag, and the silent enable flag includes a global silent enable flag or a partial silent enable flag.

The global silent enable flag is a silent enable flag acting on the multi-channel signal.

Alternatively, the partial silent enable flag is a silent enable flag acting on a part of channels in the multi-channel signal.

The silent enable flag is denoted as HasSilFlag, and the silent enable flag may be the global silent enable flag or the partial silent enable flag. Silent indication can be performed for the sound bed signal and/or the object signal by using the global silent enable flag or the partial silent enable flag, so that subsequent encoding processing, for example, bit allocation, is performed based on the global silent enable flag or the partial silent enable flag. This can improve encoding efficiency.

In some specific implementations, when the silent enable flag is the partial silent enable flag, the partial silent enable flag is an object silent enable flag acting on the object signal, or the partial silent enable flag is a sound bed silent enable flag acting on the sound bed signal, or the partial silent enable flag is a silent enable flag acting on another channel that does not include a non-low frequency effect (LFE) channel in the multi-channel signal, or the partial silent enable flag is a silent enable flag acting on a channel signal that participates in pairing in the multi-channel signal.

For example, the global silent enable flag acts on all channels, and the partial silent enable flag acts on a part of channels. For example, the object silent enable flag acts on a channel corresponding to the object signal in the multi-channel signal, and the sound bed silent enable flag acts on a channel corresponding to the sound bed signal in the multi-channel signal. For example, the object silent enable flag acting on only the object signal in the multi-channel signal is denoted as objMuteEna. For another example, the sound bed silent enable flag acting on only the sound bed signal in the multi-channel signal is denoted as bedMuteEna.

For example, the global silent enable flag is a silent enable flag acting on the multi-channel signal. When the multi-channel signal includes only the sound bed signal, the global silent enable flag is a silent enable flag acting on the sound bed signal. When the multi-channel signal includes only the object signal, the global silent enable flag is a silent enable flag acting on the object signal. When the multi-channel signal includes the sound bed signal and the object signal, the global silent enable flag is a silent enable flag acting on the sound bed signal and the object signal.

The partial silent enable flag is a silent enable flag acting on a part of channels in the multi-channel signal. The part of channels are preset. For example, the partial silent enable flag is an object silent enable flag acting on the object signal, or the partial silent enable flag is a sound bed silent enable flag acting on the sound bed signal, or the partial silent enable flag is a silent enable flag acting on another channel signal that does not include an LFE channel signal in the multi-channel signal. The partial silent enable flag is a silent enable flag acting on a channel signal that participates in pairing in the multi-channel signal. A specific manner of performing pairing processing on the multi-channel signal is not limited in this embodiment of this application.

In some embodiments of this application, the multi-channel signal includes a sound bed signal and an object signal.

The silent flag information includes the silent enable flag, and the silent enable flag includes a sound bed silent enable flag and an object silent enable flag.

The silent enable flag occupies a first bit and a second bit, the first bit is used to carry a value of the sound bed silent enable flag, and the second bit is used to carry a value of the object silent enable flag.

The silent enable flag may indicate a specific implementation of the silent enable flag by using different bits. For example, the first bit and the second bit are predefined. The first bit is used to carry the value of the sound bed silent enable flag, and the second bit is used to carry the value of the object silent enable flag. The different bits can indicate that the silent enable flag is the sound bed silent enable flag and the object silent enable flag.

In some embodiments of this application, step 401 of obtaining the silent flag information of the multi-channel signal includes:

A1: obtaining the silent flag information based on control signaling input to the encoding device; or A2: obtaining the silent flag information based on an encoding parameter of the encoding device; or A3: performing silent flag detection on each channel of the multi-channel signal to obtain the silent flag information.

The control signaling may be input to the encoding device, and the silent flag information is determined based on the control signaling. The silent flag information may be controlled by an external input. Alternatively, the encoding device includes the encoding parameter (also referred to as an encoder parameter), and the encoding parameter may be used to determine the silent flag information. The silent flag information may be preset based on the encoder parameter such as an encoding rate or encoding bandwidth. Alternatively, the silent flag information may be determined based on a silent detection result of each channel. An implementation of the silent flag information is not limited in this embodiment of this application.

In some embodiments of this application, the silent flag information includes the silent enable flag.

The silent enable flag indicates whether a silent flag detection function is enabled.

Alternatively, the silent enable flag indicates whether a silent flag of each channel of the multi-channel signal needs to be sent.

Alternatively, the silent enable flag indicates whether each channel of the multi-channel signal is a non-silent channel.

The silent enable flag indicates whether silent detection is enabled. For example, when the silent enable flag is a first value (for example, 1), it indicates that the silent detection function is enabled, and the silent flag of each channel is further detected. When the silent enable flag is a second value (for example, 0), it indicates that the silent detection function is disabled. Alternatively, the silent enable flag may indicate whether each channel is a non-silent channel. For example, when the silent enable flag is a first value (for example, 1), it indicates that the silent flag of each channel needs to be further detected. When the silent enable flag is a second value (for example, 0), it indicates that each channel is a non-silent channel.

In some embodiments of this application, the silent flag information includes the silent enable flag and the silent flag.

Step A3 of performing silent flag detection on each channel of the multi-channel signal to obtain the silent flag information includes the following.

A31: Perform silent flag detection on each channel of the multi-channel signal to obtain the silent flag of each channel.

A32: Determine the silent enable flag based on the silent flag of each channel.

The encoder side may first detect the silent flag of each channel, where the silent flag of each channel indicates whether the channel is a silent frame. The silent flag of each channel is denoted as muteflag[ch], where ch is a channel number, ch=0, . . . , N−1, and N is a total quantity of channels of a to-be-encoded input signal. A quantity of channels of a sound bed signal is M, a quantity of channels of an object signal is P, and the total quantity of channels satisfies N=M+P. For example, the to-be-encoded signal is a mixed signal including a sound bed signal and an object signal. The sound bed signal is a 5.1.4-channel signal, and a quantity of channels of the sound bed signal satisfies M=10. There are four object signals, and a quantity of channels of the object signals satisfies P=4. A total quantity of channels is 14. Channel numbers of the sound bed signal are 0 to 9, and channel numbers of the object signals are 10 to 13. The silent flag muteflag[ch] corresponds to the silent flag of each channel, and indicates whether each channel is a silent channel, where ch=0, . . . , 13. After the silent flag of each channel is determined, the silent enable flag is determined based on the silent flag of each channel.

In some embodiments of this application, the silent flag information includes the silent flag, or the silent flag information includes the silent enable flag and the silent flag.

The silent flag indicates whether each channel on which the silent enable flag acts is a silent channel, and the silent channel is a channel that does not need to be encoded or a channel that needs to be encoded at a low bit rate.

For example, channel numbers of the sound bed signal are 0 to 9, and channel numbers of the object signals are 10 to 13. The silent flag muteflag[ch] corresponds to the silent flag of each channel, and indicates whether each channel on which the silent enable flag acts is a silent channel, where ch=0, . . . , 13. The silent channel is a channel on which energy, decibels, or loudness of a signal is lower than an auditory threshold, and is a channel that does not need to be encoded or a channel that needs to be encoded at a low bit rate. When a value of the silent flag is a first value (for example, 1), it indicates that the channel is a silent channel; or when a value of the silent flag is a second value (for example, 0), it indicates that the channel is a non-silent channel. When the value of the silent flag is the first value (for example, 1), the channel is not encoded or is encoded at a low bit rate.

In some embodiments of this application, step A3 of performing silent flag detection on each channel of the multi-channel signal includes the following.

B1: Determine signal energy of each channel of a current frame of the multi-channel signal based on an input signal of the channel of the current frame.

The signal energy of each channel of the current frame is determined based on the input signal of the channel of the current frame. A value of a frame length is not limited in this embodiment of this application.

B2: Determine a silent detection parameter of each channel of the current frame based on the signal energy of the channel of the current frame.

The silent detection parameter of each channel of the current frame represents an energy value, a power value, a decibel value, or a loudness value of a signal of each channel of the current frame.

B3: Determine a silent flag of each channel of the current frame based on the silent detection parameter of the channel of the current frame and a preset silent detection threshold.

The silent detection parameter of each channel of the current frame is compared with the silent detection threshold. Using silent flag detection on a first channel of the current frame as an example, if a silent detection parameter of the first channel of the current frame is less than the silent detection threshold, the first channel of the current frame is a silent frame, that is, the first channel is a silent channel at a current moment, and a silent flag muteFlag[1] of the first channel of the current frame is the first value (for example, 1). If a silent detection parameter of the first channel of the current frame is greater than or equal to the silent detection threshold, the first channel of the current frame is a non-silent frame, that is, the first channel is a non-silent channel at a current moment, and a silent flag muteFlag[1] of the first channel of the current frame has the second value (for example, 0).

402: Perform multi-channel encoding processing on the multi-channel signal to obtain a transmission channel signal of each transmission channel.

In this embodiment of this application, the encoding device may perform multi-channel encoding processing on the multi-channel signal. There are a plurality of types of multi-channel encoding processes. For details, refer to examples in subsequent embodiments. The transmission channel signal of each transmission channel may be obtained in the foregoing encoding process.

A specific implementation of multi-channel quantization and encoding may be that a signal obtained after pairing and downmixing is changed through a neural network to obtain a potential feature; and the potential feature is quantized, and range encoding is performed. The specific implementation of multi-channel quantization and encoding may be that quantization and encoding are performed, based on vector quantization, on a signal obtained after pairing and downmixing. This is not limited in this embodiment of this application.

In some embodiments of this application, step 402 of performing multi-channel encoding processing on the multi-channel signal to obtain the transmission channel signal of each transmission channel includes the following.

C1: Perform multi-channel signal screening on the multi-channel signal to obtain a screened multi-channel signal.

For example, the encoding device completes multi-channel signal screening, and the screened signal is a multi-channel signal that participates in pairing. For example, the screened signal does not include an LFE channel. A specific screening manner is not limited.

C2: Perform pairing processing on the screened multi-channel signal to obtain a multi-channel paired signal and multi-channel side information.

For example, the encoding device screens the multi-channel signal, and the screened multi-channel signal may be a multi-channel signal that participates in pairing. After the screening on the multi-channel signal is completed, the multi-channel signal may further be paired, for example, a channel ch1 and a channel ch2 form one channel pair, to obtain the multi-channel paired signal. A specific method for pairing processing is not limited in the present invention. The multi-channel side information includes at least one of the following: a quantized codebook index of an interaural level difference parameter, a quantity of channel pairs, and a channel pair index. The quantized codebook index of the interaural level difference parameter indicates a quantized codebook index of an interaural level difference (ILD) parameter of each channel in all channels of the multi-channel signal. The quantity of channel pairs indicates a quantity of channel pairs of the current frame of the multi-channel signal. The channel pair index indicates an index of a channel pair.

C3: Perform downmixing processing on the multi-channel paired signal based on the multi-channel side information to obtain the transmission channel signal of each transmission channel.

After the multi-channel paired signal and the multi-channel side information are generated, downmixing processing may be performed on the multi-channel paired signal by using the multi-channel side information. A specific downmixing process is not described in detail. Through the foregoing multi-channel pairing and downmixing, the transmission channel signal of each transmission channel after the multi-channel pairing and downmixing may be obtained. The transmission channel may be specifically a channel after the multi-channel pairing and downmixing.

In some embodiments of this application, before step 401 of obtaining the silent flag information of the multi-channel signal, the multi-channel signal encoding method performed by the encoder side further includes the following.

D1: Preprocess the multi-channel signal to obtain a preprocessed multi-channel signal, where the preprocessing includes at least one of the following: transient state detection, window type determining, time-frequency transform, frequency-domain noise shaping, temporal noise shaping, and bandwidth extension encoding.

In the foregoing implementation scenario of performing step D1, step 401 of obtaining the silent flag information of the multi-channel signal includes:

performing silent flag detection on the preprocessed multi-channel signal to obtain the silent flag information.

An input signal of the silent flag detection may be the original input multi-channel signal, or may be the preprocessed multi-channel signal. The preprocessing may include but is not limited to processing such as transient state detection, window type determining, time-frequency transform, frequency-domain noise shaping, temporal noise shaping, and bandwidth extension encoding. The multi-channel signal may be a time-domain signal, or may be a frequency-domain signal. Through the foregoing preprocessing process, encoding efficiency of the multi-channel signal can be improved.

In some embodiments of this application, the multi-channel signal encoding method performed by the encoder side further includes the following.

E1: Preprocess the multi-channel signal to obtain a preprocessed multi-channel signal, where the preprocessing includes at least one of the following: transient state detection, window type determining, time-frequency transform, frequency-domain noise shaping, temporal noise shaping, and bandwidth extension encoding.

E2: Correct the silent flag information based on the preprocessed multi-channel signal.

The encoder side may preprocess the multi-channel signal. The preprocessing may include but is not limited to processing such as transient state detection, window type determining, time-frequency transform, frequency-domain noise shaping, temporal noise shaping, and bandwidth extension encoding. The multi-channel signal may be a time-domain signal, or may be a frequency-domain signal. After the preprocessing, the silent flag information in step 401 may be further corrected based on the preprocessed multi-channel signal. For example, after frequency-domain noise shaping, if signal energy of a channel of the multi-channel signal changes, a silent flag detection result of the channel may be adjusted.

403: Generate a bitstream based on the transmission channel signal of each transmission channel and the silent flag information, where the bitstream includes the silent flag information and a multi-channel quantization and encoding result of the transmission channel signal of each transmission channel.

The encoder side generates the bitstream, and the bitstream includes the silent flag information, so that the decoder side can obtain the silent flag information and decode the bitstream based on the silent flag information. This facilitates the decoder side to perform decoding processing, for example, bit allocation, in a manner consistent with that on the encoder side.

In some embodiments of this application, step 403 of generating the bitstream based on the transmission channel signal of each transmission channel and the silent flag information includes the following.

F1: Adjust an initial multi-channel processing manner based on the silent flag information to obtain an adjusted multi-channel processing manner.

F2: Encode the multi-channel signal in the adjusted multi-channel processing manner to obtain the bitstream.

The encoder side may adjust the initial multi-channel processing manner based on the silent flag information, and then encode the multi-channel signal in the adjusted multi-channel processing manner. This can improve encoding efficiency. For example, in a multi-channel signal screening process, a channel whose silent flag is 1 does not participate in pairing screening.

In some embodiments of this application, step 403 of generating the bitstream based on the transmission channel signal of each transmission channel and the silent flag information includes the following.

G1: Perform bit allocation for each transmission channel based on the silent flag information, a quantity of available bits, and multi-channel side information to obtain a bit allocation result of each transmission channel.

G2: Encode the transmission channel signal of each transmission channel based on the bit allocation result of the channel to obtain the bitstream.

The encoder side may use the silent flag information for bit allocation of the transmission channel, first perform initial bit allocation for each transmission channel based on the quantity of available bits and the multi-channel side information, and then perform bit allocation based on the silent flag information to obtain the bit allocation result of each transmission channel; and encode the transmission channel signal based on the bit allocation result of each transmission channel to obtain the bitstream. The bitstream may be referred to as an encoded bitstream or a bitstream of the multi-channel signal.

Further, in some embodiments of this application, step G1 of performing bit allocation for each transmission channel based on the silent flag information, the quantity of available bits, and the multi-channel side information includes the following.

G11: Perform bit allocation for each transmission channel based on the quantity of available bits and the multi-channel side information according to a bit allocation strategy corresponding to the silent flag information.

The encoder side may perform bit allocation for each transmission channel based on the silent flag information. The silent enable flag may be used to select different bit allocation strategies. Specific content of the bit allocation strategy is not limited. For example, it is assumed that the silent enable flag includes the sound bed silent enable flag bedMuteEna and the object silent enable flag objMuteEna. Performing bit allocation based on the silent flag information may be as follows: First, initial bit allocation is performed based on the total quantity of available bits and a signal feature of each transmission channel. Then, a bit allocation result is adjusted based on the silent flag information. Bit allocation adjustment can improve transmission efficiency of the multi-channel signal. For example, if the object silent enable flag objMuteEna is 1, a bit initially allocated to a channel whose muteflag is 1 in the object signal is allocated to the sound bed signal or another object channel. If both the sound bed silent enable flag bedMuteEna and the object silent enable flag are 1, a bit initially allocated to a channel whose muteflag is 1 in an object channel may be reallocated to another object channel, and a bit initially allocated to a channel whose muteflag is 1 in the sound bed signal may be reallocated to another sound bed channel.

Further, in some embodiments of this application, the multi-channel side information includes a channel bit allocation ratio.

The channel bit allocation ratio indicates a bit allocation ratio between non-low frequency effect LFE channels in the multi-channel signal.

A low frequency effect LFE channel is an audio channel with a low-frequency sound range of 3 Hz to 120 Hz, the channel may be sent to a speaker specially designed for a low tone, and the channel bit allocation ratio indicates the bit allocation ratio between the non-LFE channels. For example, the channel bit allocation ratio occupies 6 bits. A quantity of bits occupied by the channel bit allocation ratio is not limited in this embodiment of this application.

For example, the channel bit allocation ratio may be a channel bit allocation ratio field in the multi-channel side information, is represented as chBitRatios, occupies 6 bits, and indicates a bit allocation ratio of all channels other than an LFE channel in the multi-channel signal. The channel bit allocation ratio field can indicate a bit allocation ratio of each transmission channel, to determine a quantity of bits obtained by each transmission channel. Unlimitedly, the quantity of bits may be further converted into a quantity of bytes.

In some embodiments of this application, the multi-channel side information includes at least one of the following: a quantized codebook index of an interaural level difference parameter, a quantity of channel pairs, and a channel pair index.

The quantized codebook index of the interaural level difference parameter indicates a quantized codebook index of an interaural level difference (ILD) parameter of each channel in all channels.

The quantity of channel pairs indicates a quantity of channel pairs of the current frame of the multi-channel signal.

The channel pair index indicates an index of a channel pair.

A quantity of bits occupied by the quantized codebook index of the interaural level difference parameter is not limited in this embodiment of this application. For example, the quantized codebook index of the interaural level difference parameter occupies 5 bits. The quantized codebook index of the interaural level difference parameter may be represented as mcIld[ch1] or mcIld[ch2], and occupies 5 bits. A quantized codebook index of an interaural level difference ILD parameter of each channel in a current channel pair is used to restore a level of a decoding spectrum.

A quantity of bits occupied by the quantity of channel pairs is not limited in this embodiment of this application. For example, the quantity of channel pairs occupies 4 bits. The quantity of channel pairs is represented as pairCnt, occupies 4 bits, and indicates the quantity of channel pairs of the current frame.

A quantity of bits occupied by the channel pair index is not limited in this embodiment of this application. For example, the channel pair index is represented as channelPairIndex. A quantity of bits of channelPairIndex is related to a total quantity of channels, and channelPairIndex represents an index of a channel pair. Index values, that is, ch1 and ch2, of two channels in a current channel pair may be obtained through parsing.

In some embodiments of this application, in addition to the foregoing steps performed on the encoder side, the multi-channel signal encoding method performed by the encoding device further includes:

sending the bitstream to a decoding device.

In this embodiment of this application, after obtaining the transmission channel signal of each transmission channel and the silent flag information, the encoder side may generate the bitstream, where the bitstream carries the silent flag information. The encoder side may send the bitstream to the decoder side.

It can be learned from the example description of the foregoing embodiment that silent flag detection is performed on the multi-channel signal to obtain the silent flag information, where the silent flag information includes the silent enable flag and/or the silent flag; multi-channel encoding processing is performed on the multi-channel signal to obtain the transmission channel signal of each transmission channel; and the bitstream is generated based on the transmission channel signal of each transmission channel and the silent flag information, where the bitstream includes the silent flag information and the multi-channel quantization and encoding result of the transmission channel signal of each transmission channel. Subsequent encoding processing is performed based on the silent flag information, so that encoding efficiency can be improved.

Figure 5:
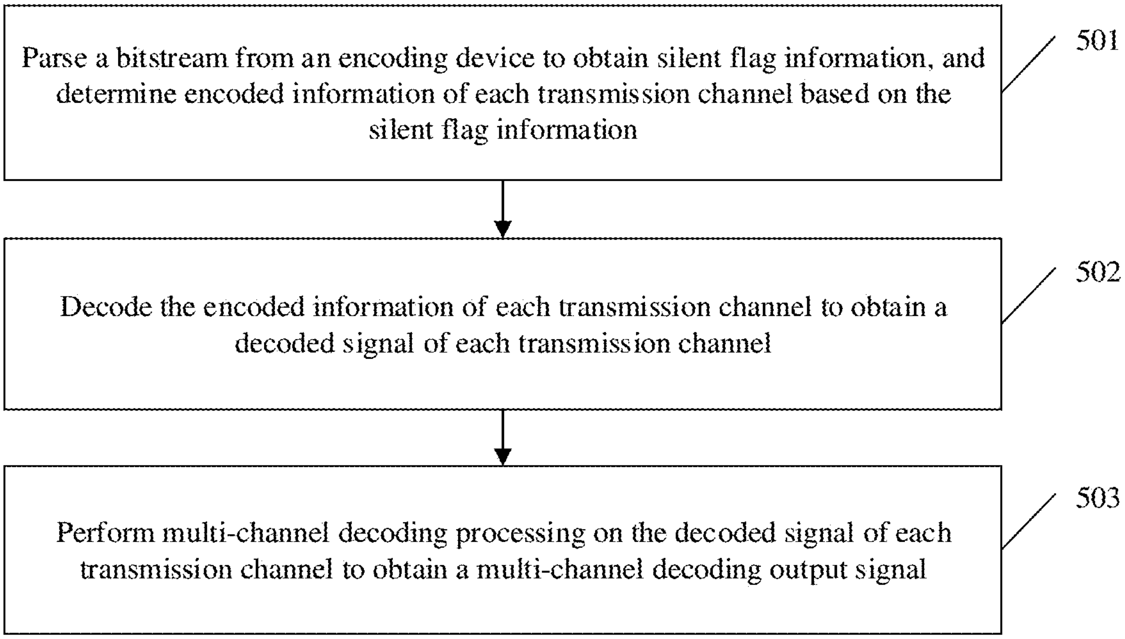
FIG. 5 is a diagram of a multi-channel signal decoding method according to an embodiment of this application.

An embodiment of this application further provides a multi-channel signal decoding method. The method may be performed by a terminal device. For example, the terminal device may be a multi-channel signal decoding apparatus (which is briefly referred to as a decoder side or a decoder below, where for example, the decoder side may be an AI decoder). As shown in FIG. 5, the method performed by the decoder side in this embodiment of this application mainly includes the following steps.

501: Parse a bitstream from an encoding device to obtain silent flag information, and determine encoded information of each transmission channel based on the silent flag information, where the silent flag information includes a silent enable flag and/or a silent flag.

The decoder side uses a processing manner inverse to that on an encoder side. The bitstream is first received from the encoding device. Because the bitstream carries the silent flag information, the encoded information of each transmission channel is determined based on the silent flag information, where the silent flag information includes the silent enable flag and/or the silent flag. For descriptions of the silent enable flag and the silent flag, refer to the description of the foregoing embodiment of the encoder side. Details are not described herein again.

In some embodiments of this application, step 501 of parsing the bitstream from the encoding device to obtain the silent flag information includes:

H1: parsing the bitstream to obtain a silent flag of each channel; or

H2: parsing the bitstream to obtain the silent enable flag, and if the silent enable flag is a first value, parsing the bitstream to obtain the silent flag; or H3: parsing the bitstream to obtain a sound bed silent enable flag and/or an object silent enable flag and a silent flag of each channel; or H4: parsing the bitstream to obtain a sound bed silent enable flag and/or an object silent enable flag, and parsing the bitstream to obtain silent flags of a part of channels in all channels based on the sound bed silent enable flag and/or the object silent enable flag.

The decoder side parses the bitstream from the encoding device to obtain the silent flag information. Based on different specific content of the silent flag information generated by the encoding device, the silent flag information obtained by the decoder side corresponds to that on the encoder side. Specifically, in a manner, the silent flag indicates whether each channel is a silent channel, and the silent channel is a channel that does not need to be encoded or a channel that needs to be encoded at a low bit rate. The decoder side may parse the bitstream to obtain the silent flag of each channel. In a manner, the silent enable flag may alternatively indicate whether each channel is a non-silent channel. For example, when the silent enable flag is a first value (for example, 1), it indicates that the silent flag of each channel needs to be further detected. When the silent enable flag is a second value (for example, 0), it indicates that each channel is a non-silent channel. The decoder side parses the bitstream to obtain the silent enable flag, and if the silent enable flag is the first value, parses the bitstream to obtain the silent flag. In a manner, the silent enable flag includes the sound bed silent enable flag and/or the object silent enable flag. The decoder side parses the bitstream to obtain the sound bed silent enable flag and/or the object silent enable flag and the silent flag of each channel. In a manner, the decoder side parses the bitstream to obtain the sound bed silent enable flag and/or the object silent enable flag, and parses the bitstream to obtain the silent flags of the part of channels based on the sound bed silent enable flag and/or the object silent enable flag. A specific part of channels whose silent flags are obtained are not limited.

502: Decode the encoded information of each transmission channel to obtain a decoded signal of each transmission channel.

After obtaining the encoded information of each transmission channel from the bitstream, the decoder side may decode the encoded information of each transmission channel. This decoding and dequantization process is inverse to a quantization and encoding process on the encoder side. In this way, the decoded signal of each transmission channel can be obtained.

In some embodiments of this application, step 502 of decoding the encoded information of each transmission channel includes the following.

I1: Parse the bitstream to obtain multi-channel side information.

I2: Perform bit allocation for each transmission channel based on the multi-channel side information and the silent flag information to obtain a quantity of encoding bits of each channel.

I3: Decode the encoded information of each transmission channel based on the quantity of encoding bits of each channel.

The bitstream may further include the multi-channel side information. The decoder side may perform bit allocation for each transmission channel based on the multi-channel side information and the silent flag information, to obtain the quantity of encoding bits of each channel. The quantity of encoding bits obtained by the decoder side is the same as a preset quantity of encoding bits on the encoder side. Then, the encoded information of each transmission channel is decoded based on the quantity of encoding bits of each transmission channel, to decode a transmission channel signal of each transmission channel.

Further, in some embodiments of this application, the multi-channel side information includes a channel bit allocation ratio field.

The channel bit allocation ratio field indicates a bit allocation ratio between non-low frequency effect (Low Frequency Effects, LFE) channels in all the channels.

A low frequency effect LFE channel is an audio channel with a low-frequency sound range of 3 Hz to 120 Hz, the channel may be sent to a speaker specially designed for a low tone. For example, the channel bit allocation ratio field occupies 6 bits. A quantity of bits occupied by the channel bit allocation ratio field is not limited in this embodiment of this application.

For example, the channel bit allocation ratio field is represented as chBitRatios, occupies 6 bits, and indicates the bit allocation ratio between the non-LFE channels in all the channels. The channel bit allocation ratio field can indicate a bit allocation ratio of each channel, to determine a quantity of bits obtained by each channel. Unlimitedly, the quantity of bits may be further converted into a quantity of bytes.

In some embodiments of this application, the multi-channel side information includes at least one of the following: a quantized codebook index of an interaural level difference parameter, a quantity of channel pairs, and a channel pair index.

The quantized codebook index of the interaural level difference parameter indicates a quantized codebook index of an interaural level difference ILD parameter of each channel in all channels.

The quantity of channel pairs indicates a quantity of channel pairs of a current frame of the multi-channel signal.

The channel pair index indicates an index of a channel pair.

A quantity of bits occupied by the quantized codebook index of the interaural level difference parameter is not limited in this embodiment of this application. For example, the quantized codebook index of the interaural level difference parameter occupies 5 bits. The quantized codebook index of the interaural level difference parameter may be represented as mcIld[ch1] or mcIld[ch2], and occupies 5 bits. A quantized codebook index of an interaural level difference ILD parameter of each channel in a current channel pair is used to restore a level of a decoding spectrum.

A quantity of bits occupied by the quantity of channel pairs is not limited in this embodiment of this application. For example, the quantity of channel pairs occupies 4 bits.

The quantity of channel pairs is represented as pairCnt, occupies 4 bits, and indicates the quantity of channel pairs of the current frame.

A quantity of bits occupied by the channel pair index is not limited in this embodiment of this application. For example, the channel pair index is represented as channelPairIndex. A quantity of bits of channelPairIndex is related to a total quantity of channels, and channelPairIndex represents an index of a channel pair. Index values, that is, ch1 and ch2, of two channels in a current channel pair may be obtained through parsing.

In some embodiments of this application, step I2 of performing bit allocation for each transmission channel based on the multi-channel side information and the silent flag information includes the following.

I21: Determine a first quantity of remaining bits based on a quantity of available bits and a quantity of safe bits.

A value of the quantity of safe bits is not limited. For example, a quantity of safe bytes is represented as safeBits, and the quantity of safe bytes is 8 bits. The first quantity of remaining bits may be obtained by subtracting the quantity of safe bits from the quantity of available bits.

I22: Allocate the first quantity of remaining bits to each channel based on the channel bit allocation ratio field in the multi-channel side information, where the channel bit allocation ratio field indicates the bit allocation ratio of each channel.

I23: When a second quantity of remaining bits still exist after the first quantity of remaining bits are allocated to each channel, allocate the second quantity of remaining bits to each channel based on the channel bit allocation ratio field.

The second quantity of remaining bits may be obtained by subtracting a quantity of bits allocated to each channel from the first quantity of remaining bits.

I24. When a third quantity of remaining bits still exist after the second quantity of remaining bits are allocated to each channel, allocate the third quantity of remaining bits to a channel having a largest quantity of allocated bits when bit allocation is performed by using the first quantity of remaining bits.

The third quantity of remaining bits may be obtained by subtracting a quantity of bits allocated to each channel from the second quantity of remaining bits.

I25: When a quantity of bits allocated to a first channel in the channels exceeds an upper limit of a quantity of bits of a single channel, allocate an excess bit to another channel in the channels other than the first channel.

The value of the upper limit of the quantity of bits of the single channel is not limited. The first channel may be any one of the channels.

503: Perform multi-channel decoding processing on the decoded signal of each transmission channel to obtain a multi-channel decoding output signal.

After obtaining the decoded signal of each transmission channel through decoding, the decoder side further performs decoding processing on the decoded signal of each transmission channel, to obtain the decoding output signal.

In some embodiments of this application, after step 503 of performing multi-channel decoding processing on the decoded signal of each transmission channel to obtain the multi-channel decoding output signal, the multi-channel signal decoding method performed by the decoder side further includes the following.

J1: Post-process the multi-channel decoding output signal, where the post-processing includes at least one of the following: bandwidth extension decoding, inverse temporal noise shaping, inverse frequency-domain noise shaping, and inverse time-frequency transform.

The foregoing process of post-processing the output signal is inverse to a preprocessing process on the encoder side, and a specific processing manner is not limited.

It can be learned from the foregoing example description that in this embodiment of this application, the decoder side may obtain the silent flag information from the bitstream from the encoder side, so that the decoder side performs decoding processing, for example, bit allocation, in a manner consistent with that on the encoder side.

For better understanding and implementation of the foregoing solutions in embodiments of this application, specific descriptions are provided below by using corresponding application scenarios as examples.

Multi-channel audio encoder products include mobile phone terminals, chips, and wireless networks.

Figure 6:
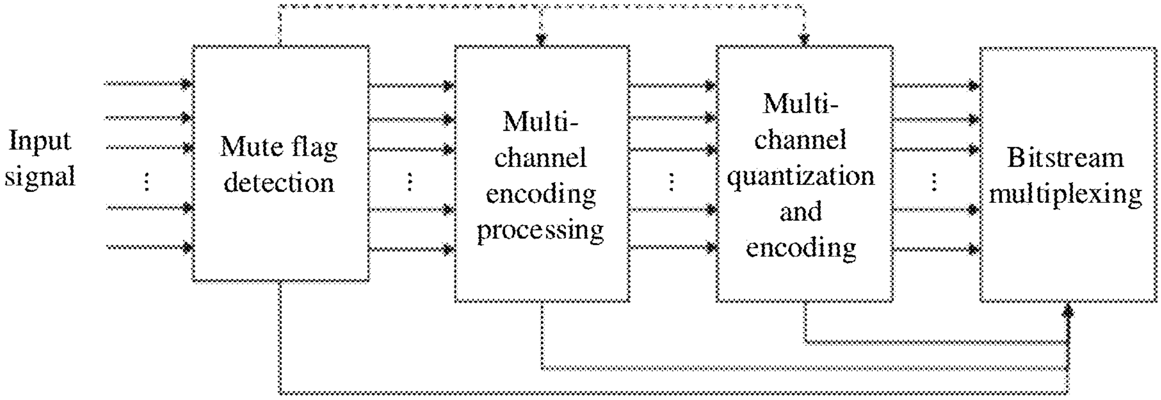
FIG. 6 is a diagram of a multi-channel signal encoding procedure according to an embodiment of this application.

As shown in FIG. 6, an encoder side in Embodiment 1 includes a silent flag detection unit, a multi-channel encoding processing unit, a multi-channel quantization and encoding unit, and a bitstream multiplexing interface.

The silent flag detection unit is mainly configured to detect silent flag information based on an input signal to determine the silent flag information. The silent flag information may include a silent enable flag and/or a silent flag.

The silent enable flag is denoted as HasSilFlag, and the silent enable flag may be a global silent enable flag or a partial silent enable flag. For example, an object silent enable flag that acts on only an object signal in a multi-channel signal is denoted as objMuteEna. For another example, a sound bed silent enable flag that acts on only an object signal in a multi-channel signal is denoted as bedMuteEna.

The global silent enable flag is a silent enable flag acting on the multi-channel signal. When the multi-channel signal includes only the sound bed signal, the global silent enable flag is a silent enable flag acting on the sound bed signal. When the multi-channel signal includes only the object signal, the global silent enable flag is a silent enable flag acting on the object signal. When the multi-channel signal includes the sound bed signal and the object signal, the global silent enable flag is a silent enable flag acting on the sound bed signal and the object signal.

The partial silent enable flag is a silent enable flag acting on a part of channels in the multi-channel signal. The part of channels are preset. For example, the partial silent enable flag is an object silent enable flag acting on the object signal, or the partial silent enable flag is a sound bed silent enable flag acting on the sound bed signal, or the partial silent enable flag is a silent enable flag acting on another channel signal that does not include an LFE channel signal in the multi-channel signal. The partial silent enable flag is a silent enable flag acting on a channel signal that participates in pairing in the multi-channel signal. A specific manner of performing pairing processing on the multi-channel signal is not limited in this embodiment of this application.

The silent enable flag indicates whether silent detection is enabled. For example, when the silent enable flag is a first value (for example, 1), it indicates that the silent detection function is enabled, and a silent flag of each channel is further detected. When the silent enable flag is a second value (for example, 0), it indicates that the silent detection function is disabled.

The silent enable flag may alternatively indicate whether a silent flag of each channel needs to be further transmitted. For example, when the silent enable flag is a first value (for example, 1), it indicates that the silent flag of each channel needs to be further transmitted. When the silent enable flag is a second value (for example, 0), it indicates that the silent flag of each channel does not need to be further transmitted.

The silent enable flag may alternatively indicate whether each channel is a non-silent channel. For example, when the silent enable flag is a first value (for example, 1), it indicates that a silent flag of each channel needs to be further detected. When the silent enable flag is a second value (for example, 0), it indicates that each channel is a non-silent channel.

The global silent enable flag acts on all channels, and the partial silent enable flag acts on a part of channels. For example, the object silent enable flag acts on a channel corresponding to the object signal in the multi-channel signal, and the sound bed silent enable flag acts on a channel corresponding to the sound bed signal in the multi-channel signal.

The silent enable flag may be controlled by an external input, may be preset based on an encoder parameter such as an encoding rate or encoding bandwidth, or may be determined based on a silent detection result of each channel.

The silent flag of each channel indicates whether the channel is a silent frame. The silent flag of each channel is denoted as silFlag[i], where ch is a channel number, ch=0, . . . , N−1, and N is a total quantity of channels of a to-be-encoded input signal. A quantity of channels of a sound bed signal is M, a quantity of channels of an object signal is P, and the total quantity of channels satisfies N=M+P. For example, the to-be-encoded signal is a mixed signal including a sound bed signal and an object signal. The sound bed signal is a 5.1.4-channel signal, and a quantity of channels of the sound bed signal satisfies M=10. There are four object signals, and a quantity of channels of the object signals satisfies P=4. A total quantity of channels is 14. Channel numbers of the sound bed signal are 0 to 9, and channel numbers of the object signals are 10 to 13. The silent flag silFlag[i] corresponds to the silent flag of each channel, and indicates whether each channel is a silent channel, where ch=0, . . . , 13. The silent channel is a channel on which energy/decibels/loudness of a signal is lower than an auditory threshold, and is a channel that does not need to be encoded or a channel that needs to be encoded at only a low bit rate. When a value of the silent flag is a first value (for example, 1), it indicates that the channel is a silent channel; or when a value of the silent flag is a second value (for example, 0), it indicates that the channel is a non-silent channel. When the value of the silent flag is the first value (for example, 1), the channel is not encoded or is encoded at a low bit rate.

An input signal of the silent flag detection may be an original input signal, or may be a preprocessed signal. The preprocessing may include but is not limited to processing such as transient state detection, window type determining, time-frequency transform, frequency-domain noise shaping, temporal noise shaping, and bandwidth extension encoding. The input signal may be a time-domain signal, or may be a frequency-domain signal. Using an example in which the input signal is a time-domain signal of each channel in a multi-channel signal, a method for detecting a silent flag of each channel may be as follows.

Signal energy of each channel of a current frame is determined based on an input signal of each channel of the current frame.

Assuming that a frame length is FRAME_LEN, energy energy(ch) of a $ch^{th}$ channel of the current frame is:

$$\text{energy}(ch) = \frac{1}{\text{FRAME\_LEN}} \cdot \sum_{i=0}^{FRAME\_LEN-1} (orig_{ch}(i))^2.$$

Herein, $orig_{ch}$ is an input signal of the $ch^{th}$ channel of the current frame, and energy(ch) is the energy of the $ch^{th}$ channel of the current frame.

A silent detection parameter of each channel of the current frame is determined based on the signal energy of the channel of the current frame.

The silent detection parameter of each channel of the current frame represents an energy value, a power value, a decibel value, or a loudness value of a signal of each channel of the current frame.

For example, the silent detection parameter of each channel of the current frame may be a value, in a log domain, of the signal energy of the channel of the current frame, for example, log 2(energy(ch)) or log 10(energy(ch)). The silent detection parameter of each channel of the current frame is calculated based on the signal energy of the channel of the current frame. The silent detection parameter of each channel of the current frame satisfies the following condition:

$$\text{energyDB}[ch] = 10 * \log 10(\text{energy}[ch]/\text{Bit\_Depth}/\text{Bit\_Depth}).$$

Herein, energyDB[ch] is a silent detection parameter of the $ch^{th}$ channel of the current frame, energy(ch) is the energy of the $ch^{th}$ channel of the current frame, and Bit_Depth is a maximum representable value of a bit width. For example, if a sampling bit depth is 16 bits, the maximum representable value of the bit width is $2^{16}=65536$.

A silent flag of each channel of the current frame is determined based on the silent detection parameter of each channel of the current frame and a silent detection threshold.

The silent detection parameter of each channel of the current frame is compared with the silent detection threshold. If the silent detection parameter of the $ch^{th}$ channel of the current frame is less than the silent detection threshold, the $ch^{th}$ channel of the current frame is a silent frame, that is, the $ch^{th}$ channel is a silent channel at a current moment, and a silent flag silFlag[i] of the $ch^{th}$ channel of the current frame is a first value (for example, 1). If the silent detection parameter of the $ch^{th}$ channel of the current frame is greater than or equal to the silent detection threshold, the $ch^{th}$ channel of the current frame is a non-silent frame, that is, the $ch^{th}$ channel is a non-silent channel at a current moment, and a silent flag silFlag[i] of the $ch^{th}$ channel of the current frame is a second value (for example, 0).

Based on the silent detection parameter of the $ch^{th}$ channel of the current frame and the silent detection threshold, pseudocode of the silent flag of the $ch^{th}$ channel of the current frame is determined as follows:

```
silFlag[i]=0;
  if (energyDB[ch]<g_MuteThrehold)
{silFlag[i]=1;}
```

The silent flag information may include a silent enable flag and/or a silent flag, and different silent flag information forms the following examples.

Manner 1: The silent flag information is a silent flag silFlag[i] of each channel. The silent flag silFlag[i] of each channel is determined, the silent flag silFlag[i] of each channel is written into a bitstream, and the bitstream is transmitted to a decoder side.

Manner 2: The silent flag information includes a silent enable flag HasSilFlag and a silent flag silFlag[i].

The silent enable flag HasSilFlag indicates whether a silent detection function is enabled for the current frame, and may also indicate whether a silent detection result of each channel is transmitted in the current frame.

The silent enable flag HasSilFlag is determined and written into a bitstream, and the bitstream is transmitted to a decoder side. Whether to write the silent flag silFlag[i] into the bitstream is determined based on a value of the silent enable flag.

When the silent enable flag HasSilFlag is 0, the silent flag silFlag[i] is not written into the bitstream for transmission to the decoder side.

When the silent enable flag HasSilFlag is 1, the silent flag silFlag[i] is written into the bitstream for transmission to the decoder side.

Manner 3: The silent flag information includes a sound bed silent enable flag bedMuteEna, an object silent enable flag objMuteEna, and a silent flag silFlag[i] of each channel.

The sound bed silent enable flag bedMuteEna may indicate whether a silent detection function for a channel corresponding to a sound bed signal is enabled in the current frame. Similarly, the object silent enable flag objMuteEna may indicate whether a silent detection function for a channel corresponding to an object signal is enabled in the current frame. Examples are as follows.

When the sound bed silent enable flag bedMuteEna is 0, and the object silent enable flag objMuteEna is 1, a silent flag value of the channel corresponding to the sound bed signal is set to 0, that is, indicates a non-silent channel. A silent flag value of the channel corresponding to the object signal is a silent detection result.

When the sound bed silent enable flag bedMuteEna is 1, and the object silent enable flag objMuteEna is 0, a silent flag value of the channel corresponding to the object signal is set to 0, that is, indicates a non-silent channel. A silent flag value of the channel corresponding to the sound bed signal is a silent detection result.

When the sound bed silent enable flag bedMuteEna is 0, and the object silent enable flag objMuteEna is 0, a silent flag value of each channel is set to 0, that is, indicates a non-silent channel.

When the sound bed silent enable flag bedMuteEna is 1, and the object silent enable flag objMuteEna is 1, a silent flag of each channel is a silent detection result.

When the silent flag information includes the sound bed silent enable flag bedMuteEna, the object silent enable flag objMuteEna, and the silent flag, the silent flag of each channel may be transmitted.

Manner 4: The silent flag information includes a sound bed silent enable flag bedMuteEna, an object silent enable flag objMuteEna, and silent flags silFlag[i] of a part of channels.

A difference between Manner 4 and Manner 3 is that silent flags of only a part of channels are transmitted. For example, when the sound bed silent enable flag bedMuteEna is 0, and the object silent enable flag objMuteEna is 1, only a silent flag of a channel corresponding to an object signal may be transmitted, and a silent flag of a channel corresponding to a sound bed signal is not transmitted. When the sound bed silent enable flag bedMuteEna is 1, and the object silent enable flag objMuteEna is 0, only a silent flag of a channel corresponding to a sound bed signal may be transmitted. When the sound bed silent enable flag bedMuteEna is 0, and the object silent enable flag objMuteEna is 0, the silent flag of each channel does not need to be transmitted. When the sound bed silent enable flag bedMuteEna is 1 and the object silent enable flag objMuteEna is 1, the silent flag of each channel is transmitted.

Manner 5: The sound bed silent enable flag bedMuteEna and the object silent enable flag objMuteEna may be replaced with HasSilFlag={HasSilFlag(0), HasSilFlag(1)} for representation, where HasSilFlag(0) and HasSilFlag(1) respectively correspond to bedMuteEna and objMuteEna. Alternatively, a 2-bit silent enable flag HasSilFlag may indicate the sound bed silent enable flag bedMuteEna and the object silent enable flag objMuteEna. This is not limited in embodiments of this application.

Manner 6: A silent flag of each channel is first determined, and then a silent enable flag is determined based on the silent flag of each channel.

For example, the silent enable flag may be a global silent enable flag. If the silent flag of each channel is 0, the global silent enable flag is set to 0. In this case, only the global silent enable flag needs to be written into a bitstream for transmission to a decoder side, and the silent flag of each channel does not need to be transmitted. If at least one of silent flags of all channels is 1, the global silent enable flag is set to 1. In this case, only the global silent enable flag needs to be written into a bitstream for transmission to a decoder side, and the silent flag of each channel does not need to be transmitted.

For another example, the silent enable flag may be a sound bed silent enable flag bedMuteEna and an object silent enable flag objMuteEna. The sound bed silent enable flag bedMuteEna is used as an example. If a silent flag of each channel corresponding to a sound bed signal is 0, the sound bed silent enable flag is set to 0. In this case, only the sound bed silent enable flag needs to be written into a bitstream for transmission to a decoder side, and the silent flag of each channel corresponding to the sound bed signal does not need to be transmitted. If at least one of silent flags of all channels corresponding to the sound bed signal is 1, the sound bed silent enable flag is set to 1. In this case, only the sound bed silent enable flag needs to be written into a bitstream for transmission to a decoder side, and the silent flag of each channel corresponding to the sound bed signal does not need to be transmitted. Similar processing may be performed for the object silent enable flag objMuteEna, and details are not described herein again.

Only some implementations are listed in embodiments of this application, and there may be another possible implementation. This is not limited.

The multi-channel encoding processing unit completes multi-channel signal screening, pairing, downmixing processing, and multi-channel side information generation, and obtains each transmission channel signal after multi-channel pairing and downmixing.

Figure 7:
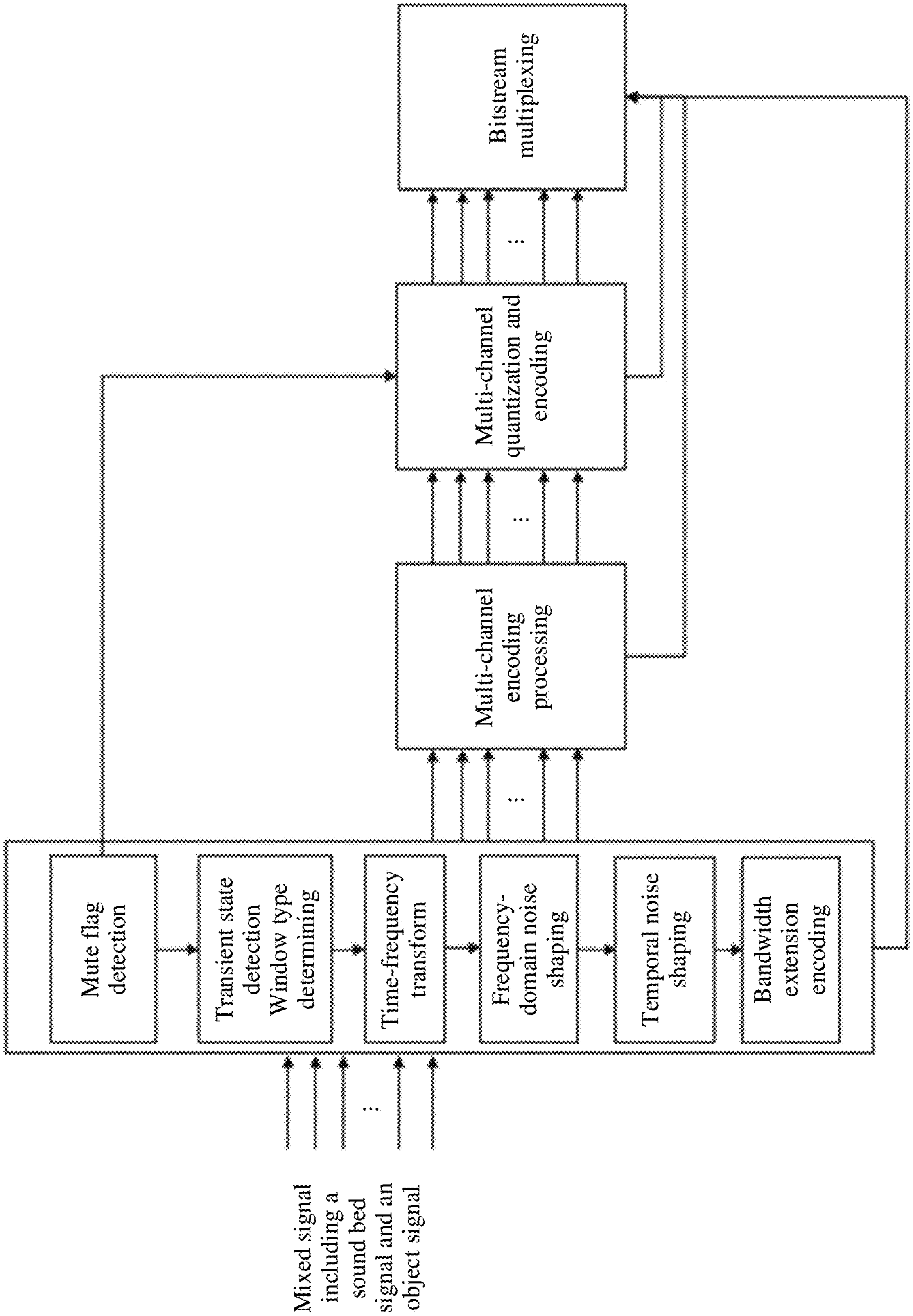
FIG. 7 is a diagram of a multi-channel signal encoding procedure according to an embodiment of this application.

Optionally, preprocessing may be further included between the silent flag detection processing and the multi-channel encoding processing, to preprocess an input signal, to obtain a preprocessed signal as an input of the multi-channel encoding processing. The preprocessing may include but is not limited to processing such as transient state detection, window type determining, time-frequency transform, frequency-domain noise shaping, temporal noise shaping, and bandwidth extension encoding. This is not limited in embodiments of this application. As shown in FIG. 7, multi-channel signal screening is performed based on a multi-channel input signal or a preprocessed multi-channel signal, to obtain a screened multi-channel signal. Pairing processing is performed on the screened multi-channel signal to obtain a multi-channel paired signal. Downmixing processing (for example, middle-side information (MIDSIDE, MS) processing) is performed on the multi-channel paired signal to obtain a to-be-encoded signal after multi-channel pairing and downmixing.

Optionally, in a preprocessing process, the silent flag information may be corrected. For example, after frequency-domain noise shaping, if signal energy of a transmission channel changes, a silent detection result of the channel may be adjusted.

The multi-channel side information includes but is not limited to a quantity of pairs, a index list of paired channels, a list of interaural level difference ILD coefficients of paired channels, and a list of ILD big endians and little endians of paired channels.

Optionally, an initial multi-channel processing manner may be adjusted based on the silent flag information. For example, in a multi-channel signal screening process, a channel whose silent flag is 1 does not participate in pairing screening.

The multi-channel quantization and encoding unit is configured to perform quantization and encoding on each transmission channel signal after multi-channel pairing and downmixing.

The multi-channel quantization and encoding include bit allocation processing and encoding.

Optionally, bit allocation is performed based on the silent flag information, a quantity of available bits, and multi-channel side information; and encoding is performed based on a bit allocation result of each channel to obtain an encoded bitstream.

A specific implementation of multi-channel quantization and encoding may be that a signal obtained after pairing and downmixing is changed through a neural network to obtain a potential feature; and the potential feature is quantized, and range encoding is performed. The specific implementation of multi-channel quantization and encoding may be that quantization and encoding are performed, based on vector quantization, on a signal obtained after pairing and downmixing. This is not limited in embodiments of this application.

Optionally, bit allocation may be performed based on the silent flag information. For example, different bit allocation strategies are selected based on the silent enable flag.

It is assumed that the silent enable flag includes the sound bed silent enable flag bedMuteEna and the object silent enable flag objMuteEna. Performing bit allocation based on the silent flag information may be as follows: First, initial bit allocation is performed based on the total quantity of available bits and a signal feature of each channel. Then, a bit allocation result is adjusted based on the silent flag information. For example, if the object silent enable flag objMuteEna is 1, a bit initially allocated to a channel whose silent flag is 1 in the object signal is allocated to the sound bed signal or another object channel. If both the sound bed silent enable flag bedMuteEna and the object silent enable flag are 1, a bit initially allocated to a channel whose silent flag is 1 in an object channel may be reallocated to another object channel, and a bit initially allocated to a channel whose silent flag is 1 in the sound bed signal may be reallocated to another sound bed channel.

The bitstream multiplexing interface multiplexes an encoded channel to form a serial bitstream for transmission on a channel or storage in digital media.

Figure 8:
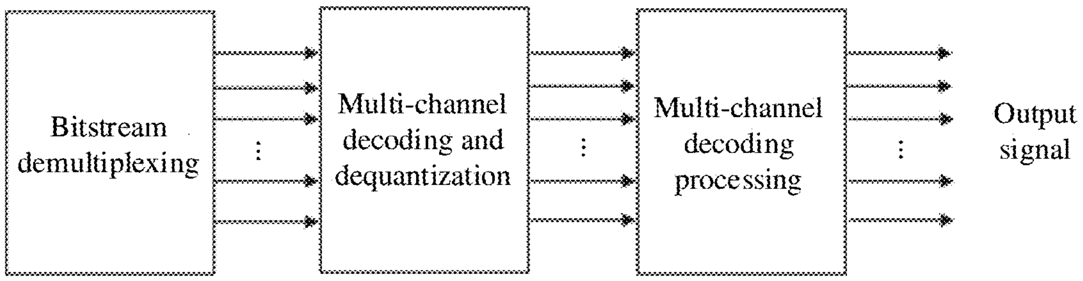
FIG. 8 is a diagram of a multi-channel signal decoding procedure according to an embodiment of this application.

As shown in FIG. 8, a decoder side in an embodiment includes a bitstream demultiplexing unit, a channel decoding and dequantization unit, a multi-channel decoding processing unit, and a multi-channel post-processing unit.

The bitstream demultiplexing unit is configured to parse a received bitstream to obtain silent flag information, and determine encoded information of each channel.

The received bitstream is parsed to obtain the silent flag information, and a parsing process is an inverse process of a process of writing the silent flag information into the bitstream by an encoder side.

For example, if the encoder side uses Manner 1, the decoder side parses the bitstream to obtain the silent flag silFlag[i] of each channel, where ch=0, . . . , N−1, and N is a quantity of channels of a to-be-decoded multi-channel signal.

Alternatively, if the encoder side uses Manner 2, the decoder side first parses the bitstream to obtain the silent enable flag HasSilFlag; and when the silent enable flag HasSilFlag is a first value (for example, 1), parses the bitstream to obtain the silent flag silFlag[i], where ch=0, . . . , N−1, and N is a quantity of channels of a to-be-decoded multi-channel signal.

Alternatively, if the encoder side uses Manner 3, the decoder side first parses the bitstream to obtain the sound bed silent enable flag bedMuteEna, the object silent enable flag objMuteEna, and the silent flag silFlag[i] of each channel, where ch=0, . . . , N−1, and N is a quantity of channels of a to-be-decoded multi-channel signal.

Alternatively, if the encoder side uses Manner 4, the decoder side first parses the bitstream to obtain the sound bed silent enable flag bedMuteEna and the object silent enable flag objMuteEna; and then parses the bitstream to obtain a silent flag of a corresponding channel based on the sound bed silent enable flag bedMuteEna and the object silent enable flag objMuteEna obtained through parsing. For example, when the sound bed silent enable flag bedMuteEna is 0, and the object silent enable flag objMuteEna is 1, the bitstream is parsed to obtain the silent flag of the channel corresponding to the object signal. When the sound bed silent enable flag bedMuteEna is 1, and the object silent enable flag objMuteEna is 0, the bitstream is parsed to obtain the silent flag of the channel corresponding to the sound bed signal. When the sound bed silent enable flag bedMuteEna is 0, and the object silent enable flag objMuteEna is 0, the bitstream does not need to be parsed to obtain a silent flag. When the sound bed silent enable flag bedMuteEna is 1, and the object silent enable flag objMuteEna is 1, the bitstream is parsed to obtain the silent flag of each channel. A quantity of parsed channels is a sum of a quantity of channels corresponding to the sound bed signal and a quantity of channels corresponding to the object signal.

Using the following manner as an example, specific syntax of parsing, by the decoder side, the bitstream to obtain the silent flag information is as follows:

The received bitstream is parsed to obtain multi-channel side information.

Bit allocation is performed based on the multi-channel side information, and a quantity of encoding bits of each channel is determined. Optionally, if the encoder side performs bit allocation based on the silent flag information, the decoder side also needs to perform bit allocation based on the silent flag information to determine the quantity of encoding bits of each channel.

Encoded information of each channel is determined from the received bitstream based on the quantity of encoding bits of each channel.

The decoding unit is configured to perform inverse encoding and inverse quantization on each encoded channel to obtain a decoded signal after multi-channel pairing and downmixing.

Inverse encoding and inverse quantization are inverse processes of multi-channel quantization and encoding on the encoder side.

The multi-channel decoding processing unit is configured to perform multi-channel decoding processing on the decoded signal after pairing and downmixing to obtain a multi-channel output signal.

Multi-channel decoding processing is an inverse process of multi-channel encoding processing. The multi-channel output signal is reconstructed by using the multi-channel side information based on the decoded signal after multi-channel pairing and downmixing.

Figure 9:
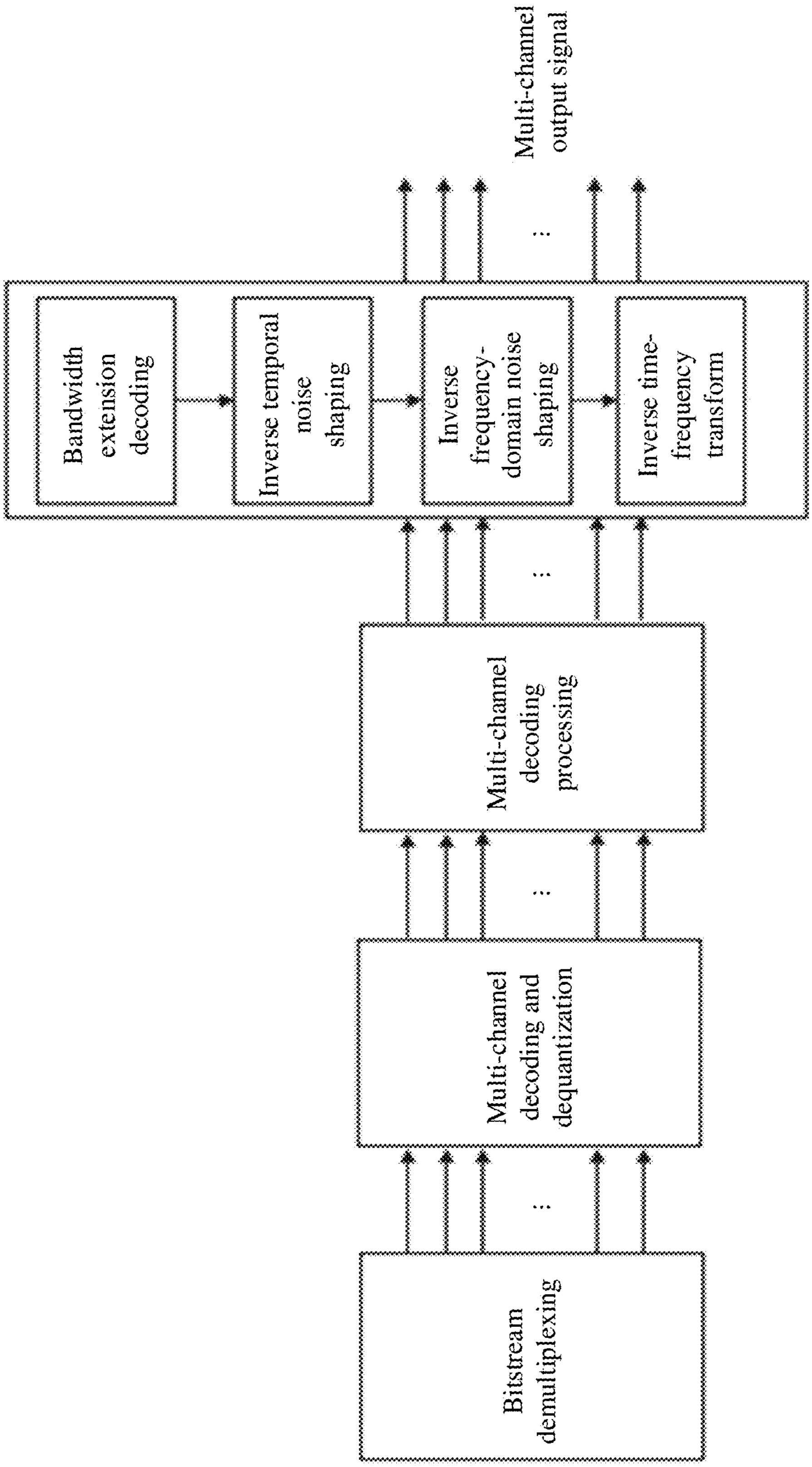
FIG. 9 is a diagram of a multi-channel signal decoding procedure according to an embodiment of this application.

As shown in FIG. 9, if preprocessing is further included before the multi-channel encoding processing on the encoder side, corresponding post-processing is further included after the multi-channel decoding processing on the decoder side, for example, bandwidth extension decoding, inverse temporal noise shaping, inverse frequency-domain noise shaping, or inverse time-frequency transform, to obtain a final output signal.

It can be learned from the foregoing example description that silent flag information detection is performed on the multi-channel input signal to determine the silent flag information, and subsequent encoding processing, for example, bit allocation, is performed based on the silent flag information, so that encoding efficiency can be improved.

An embodiment of this application provides a method for generating a silent flag bitstream based on a feature of an input signal. An encoder side performs silent flag information detection on a multi-channel input signal to determine silent flag information; transmits the silent flag information to a decoder side; and performs bit allocation based on the silent flag information, and encodes the multi-channel signal. The decoder side parses the bitstream to obtain the silent flag information; and performs bit allocation based on the silent flag information, and decodes the multi-channel signal.

In the technical solutions included in embodiments of this application, each input signal is calculated to obtain a silent flag bit, to guide bit allocation for encoding and decoding. Whether an input signal to a channel is a silent frame is determined. If the input signal is a silent frame, the channel is not encoded or is encoded with a small quantity of bits. A decibel value or a loudness value of the signal is calculated at an input end, and is compared with a specified auditory threshold. If the decibel value or the loudness value is lower than the auditory threshold, a silent flag is set to 1; or if the decibel value or the loudness value is not lower than the auditory threshold, a silent flag is set to 0. When the silent flag is 1, the channel is not encoded or is encoded at a low bit rate. Data before quantization of a channel whose mute flag is 1 may be changed to 0. The silent flag is transmitted to the decoder side as side information to guide bit demultiplexing on the decoder side. Transmission syntax on the encoder side is as follows: HasSilFlag is used to indicate that the silent flag is enabled. 1 bit can be used to transmit HasSilFlag. When HasSilFlag=1, the silent flag of each channel is further transmitted. When HasSilFlag=0, the silent flag of each channel is not transmitted. For example, for the 5.1.4 channels, a 10-bit silent flag is transmitted in multi-channel side information, and each channel has 1 bit. A sequence is consistent with that of channel input. Another module of the encoder side may change the silent flag from 1 to 0 and transmit the silent flag in a bitstream.

Embodiments of this application have the following advantages: Silent flag information detection is performed on the multi-channel input signal to determine the silent flag information, and subsequent encoding processing, for example, bit allocation, is performed based on the silent flag information. A silent channel may not be encoded or may be encoded at a low bit rate, thereby saving encoding bits and improving encoding efficiency.

The silent flag information is transmitted to the decoder side, so that the decoder side performs decoding processing, for example, bit allocation, in a manner consistent with that on the encoder side.

In some other embodiments of this application, an improved mixed encoding scheme is described as follows:

Encoding and decoding in a mixed mode support encoding and decoding of a sound bed signal and an object signal. A specific implementation solution is divided into three parts.

Mixed encoding bit pre-allocation: A quantity of pre-allocated bits of a sound bed signal bedAvailbleBytes and a quantity of pre-allocated bits of an object signal objAvailbleBytes are obtained based on multi-channel side information bedBitsRatio.

Mixed encoding bit allocation: This is divided into four steps, which are sequentially: silent frame bit allocation, non-silent frame bit allocation adaptation, non-silent frame bit allocation, and non-silent frame bit allocation adaptation restoration, in a processing sequence.

Silent frame bit allocation: If there is a silent frame, a bit is allocated to a channel of the silent frame based on a silent flag silFlag[i] in the side information and a mixed allocation strategy mixAllocStrategy, and the quantity of pre-allocated bits of the sound bed signal bedAvailbleBytes and the total quantity of pre-allocated bits of the object signal objAvailbleBytes are updated.

Non-silent frame bit allocation adaptation: A channel parameter sequence is mapped to facilitate non-silent frame bit allocation processing.

Non-silent frame bit allocation: A bit is allocated based on an updated quantity of pre-allocated bits of the sound bed signal bedAvailbleBytes, an updated quantity of pre-allocated bits of the object signal objAvailbleBytes, and a channel bit allocation ratio factor chBitRatios.

Non-silent frame bit allocation adaptation restoration: Inverse mapping is performed on the channel parameter sequence to facilitate use in subsequent steps of range decoding, inverse quantization, and neural network inverse transform.

Mixed encoding upmixing: M/S upmixing is performed based on two paired channels ch1 and ch2 that are indicated by a channel pair index channelPairIndex, to obtain an upmixed channel signal.

Syntax of multi-channel stereo side information is shown in Table 1, and is syntax DecodeMcSideBits( ).

| Syntax | Quantity of bits | Mnemonic symbol |
| --- | --- | --- |
| DecodeMcSideBits( ) { | | |
| if((codingProfile == 1) && (soundBedType == 1)) { | | |
| bedBitsRatio | 4 | uimsbf |
| } | | |
| HasSilFlag | 1 | uimsbf |
| if(HasSilFlag){ | | |
| if((codingProfile == 1) && (soundBedType == 1)) { | | |
| mixAllocStrategy | 2 | uimsbf |
| } | | |
| for(i = 0; i <numChans; i++) { | | |

-continued

| Syntax | Quantity of bits | Mnemonic symbol |
| --- | --- | --- |
| silFlag[i] | 1 | uimsbf |
| } | | |
| } | | |
| pairCnt | 4 | uimsbf |
| for(i = 0; i <pairCnt; i++) { | | |
| channelPairIndex | Note 1 | uimsbf |
| mcIld[ch1] | 4 | uimsbf |
| mcIld[ch2] | 4 | uimsbf |
| scaleFlag[ch1] | 1 | uimsbf |
| scaleFlag[ch2] | 1 | uimsbf |
| } | | |
| for (i = 0; i <coupleChNum; i++) { | | |
| chBitRatios[i] | 4 | uimsbf |
| } | | |
| } | | |

Note 1:
A quantity of bits of channelPairIndex is determined by a quantity coupleChNum of channels that participate in pairing. A calculation manner is floor(log2(coupleChNum * (coupleChNum − 1)/2 − 1)) + 1.

A semantic description is as follows: bedBitsRatio occupies 4 bits, and represents an index of a ratio factor of the sound bed signal in terms of a total quantity of bits. A value ranges from 0 to 15, and corresponding floating-point ratios are as follows:

1: 0.0625
2: 0.125
3: 0.1875
4: 0.25
5: 0.3125
6: 0.375
7: 0.4375
8: 0.5
9: 0.5625
10: 0.625
11: 0.6875
12: 0.75
13: 0.8125
14: 0.875
15: 0.9375 mixAllocStrategy occupies 2 bits, and indicates an allocation strategy for a mixed signal of the sound bed signal and the object signal. The mixed allocation strategy may be predetermined, or the mixed allocation strategy is predefined based on an encoding parameter. The encoding parameter includes an encoding rate or a signal feature parameter. The encoding parameter is predetermined. A value range and meaning of the allocation strategy are as follows:

0: A redundant sound bed bit generated due to a mute mechanism (silent flag) is allocated to the sound bed signal, a redundant object bit is allocated to the object signal, and a bit of a silent sound bed is allocated to a non-silent sound bed.

1: A redundant sound bed bit generated due to a mute mechanism is allocated to the sound bed signal, and a redundant object bit is allocated to the sound bed signal.

2: A redundant sound bed bit generated due to a mute mechanism is allocated to the object signal, and a redundant object bit is allocated to the object signal.

3: Reserved.

HasSilFlag occupies 1 bit. 0 indicates that silent frame processing is disabled or there is no silent frame. 1 indicates that silent frame processing is enabled and there is a silent frame.

silFlag[i] occupies 1 bit and indicates a silent frame flag of a corresponding channel. 0 indicates a non-silent frame, and 1 indicates a silent frame.

soundBedType occupies 1 bit, and indicates a type of sound bed. 0 indicates only an object signal or none (only objs). 1 indicates a sound bed signal or a HOA signal or mc or hoa.

codingProfile occupies 3 bits. 0 indicates a mono channel, a stereo signal, or a sound bed signal for mono/stereo/mc. 1 indicates a mixed signal of a sound bed and an object for channel+obj mix. 2 is for hoa.

pairCnt occupies 4 bits, and indicates a quantity of channel pairs of a current frame.

A quantity of bits of channelPairIndex is related to a total quantity of channels. For details, refer to Note 1 in the foregoing table. channelPairIndex indicates an index of a channel pair, and may be parsed to obtain index values, that is, ch1 and ch2, of two channels in the current channel pair.

mcIld[ch1] or mcIld[ch2] occupies 4 bits, indicates an interaural level difference parameter of each channel in the current channel pair, and is used to restore a level of a decoding spectrum.

scaleFlag[ch1] or scaleFlag[ch2] occupies 1 bit, indicates a scaling flag parameter of each channel in the current channel pair, and indicates whether a level of a current channel is scaled down or scaled up.

chBitRatios occupies 4 bits, and indicates a bit allocation ratio of each channel.

A decoding process is as follows: First, mixed encoding bit pre-allocation is performed.

A function of a mixed encoding bit pre-allocation module is to calculate a quantity of pre-allocated bytes of a sound bed and a quantity of pre-allocated bytes of an object based on an index parameter of a ratio factor of the sound bed signal in terms of a total quantity of bits that is decoded from a bitstream and a remaining quantity of available bits obtained after other side information is removed, and provide the quantity of pre-allocated bytes of the sound bed and the quantity of pre-allocated bytes of the object for a subsequent module for use.

A remaining quantity of available bytes obtained after the other side information is removed from the current frame is denoted as availableBytes. The quantity of pre-allocated bytes of the sound bed is bedAvailbleBytes, and the quantity of pre-allocated bytes of the object is objAvailbleBytes. The index parameter of the ratio factor of the sound bed signal in terms of the total quantity of bits is bedBitsRatio, and a floating-point ratio factor corresponding to bedBitsRatio is bedBitsRatioFloat. For a correspondence between bedBitsRatio and bedBitsRatioFloat, refer to the bedBitsRatio part in the foregoing semantics.

Formulas for calculating the quantity of pre-allocated bytes of the sound bed bedAvailbleBytes and the quantity of pre-allocated bytes of the object obj AvailbleBytes based on the quantity of available bytes availableBytes and the floating-point ratio factor of the sound bed signal in terms of the total quantity of bits bedBitsRatioFloat are as follows:

bedAvailbleBytes=floor(availableBytes*bedBitsRatioFloat);

objAvailbleBytes=availableBytes−bedAvailbleBytes.

A mixed encoding bit allocation process is as follows: During mixed encoding bit allocation, parameters such as a bit allocation parameter and the quantity of available bytes in the bitstream are jointly used to allocate the available bytes to each downmixed channel in a mixed encoding multi-channel stereo sound, to complete subsequent steps of range decoding, inverse quantization, and neural network inverse transform. The mixed encoding bit allocation includes the following parts.

Bit allocation for a silent frame channel: A function of a bit allocation processing module for the silent frame channel is to complete bit allocation for a mixed signal silent frame based on the allocation strategy parameter mix AllocStrategy of the mixed signal of the sound bed signal and the object signal that is decoded from the bitstream and silent frame flag parameters, namely, the silent enable flag HasSilFlag and the silent flag silFlag, decoded from the bitstream.

Step 1: Mixed Encoding Silent Frame Bit Allocation Processing.

A mixed encoding silent frame bit allocation processing submodule completes bit allocation for a mixed encoding silent frame based on the silent frame flag-related parameters HasSilFlag and silFlag decoded from the bitstream. There are the following cases and corresponding processing.

Case 1: When HasSilFlag is parsed as 0, it indicates that a silent frame processing mode is not enabled for the current frame or the current frame does not include a silent frame, and the mixed encoding silent frame bit allocation processing submodule does not perform another operation.

Case 2: When HasSilFlag is parsed as 1, it indicates that silent frame processing is enabled for the current frame and there is a silent frame. In this case, silFlag[i] of all channels is traversed. When silFlag[i] is 1, a quantity of bytes of the channel channelBytes[i] is set to a minimum quantity of safe bytes safetyBytes. A value of the minimum quantity of safe bytes safetyBytes is related to a requirement of a quantization and range encoding module on a quantity of input bytes, and for example, may be set to 10 bytes herein.

The quantity of pre-allocated bytes of the object objAvailbleBytes is updated. An object channel whose silFlag[i] is 1 is traversed, and the following operation is performed for each object channel whose silFlag[i] is 1:

objAvailbleBytes−=safetyBytes.

The quantity of pre-allocated bytes of the sound bed bedAvailbleBytes is updated. A sound bed channel whose silFlag[i] is 1 is traversed, and the following operation is performed for each sound bed channel whose silFlag[i] is 1:

bedAvailbleBytes−=safetyBytes.

Step 2: Silent Frame Remaining Bit Allocation Strategy.

A function of a silent frame bit allocation strategy submodule is to determine, based on the allocation strategy parameter mixAllocStrategy of the mixed signal of the sound bed signal and the object signal that is decoded from the bitstream, whether to allocate remaining bits generated by a silent frame to the sound bed signal or the object signal, when there is the silent frame. The specific allocation strategy is determined by a value of mixAllocStrategy. For details about the value of mixAllocStrategy, refer to the mixAllocStrategy part.

In embodiments of this application, two different silent frame remaining bit allocation strategies are supported. First, pre-calculation is performed.

An average quantity of allocated bytes of the object channel objAvgBytes is calculated based on the quantity of pre-allocated bytes of the object objAvailbleBytes and a quantity of object channels objNum. A calculation formula is as follows:

$$objAvgBytes[i]=floor(objAvailbleBytes/objNum).$$

If there are remaining bytes after average allocation, the remaining bytes are split into a plurality of pieces of 1 byte and are allocated for the second time in ascending order of sequence numbers of object signals. That is, when sum (objAvgBytes[i])<objAvailbleBytes, objAvgBytes[0]+=1. The same operation is performed for objAvgBytes[i] of another object channel, until sum (objAvgBytes[i])==objAvailbleBytes. Then, the operation ends.

Scheme 1: When mixAllocStrategy is 0, an object silent frame remaining bit objSilLeftBytes whose initial value is 0 is defined, and silFlag[i] corresponding to all object channels is traversed. When silFlag[i]=1, the value of objSilLeftBytes is updated, that is, $$objSilLeftBytes+=objAvailbleBytes[i]-safetyBytes;\quad 0<=i<objNum,$$

until all obj channels are traversed.

Scheme 2: When mixAllocStrategy is 1, an object silent frame remaining bit objSilLeftBytes whose initial value is 0 is defined, and silFlag[i] corresponding to all object channels is traversed. When silFlag[i]=1, the value of objSilLeftBytes is updated, that is, $$objSilLeftBytes+=objAvailbleBytes[i]-safetyBytes;\quad 0<=i<objNum,$$

until all obj channels are traversed.

The quantity of pre-allocated bytes of the sound bed bedAvailbleBytes and the quantity of pre-allocated bytes of the object objAvailbleBytes are updated, for example, in the following manner:

bedAvailbleBytes+=objSilLeftBytes;

objAvailbleBytes−=objSilLeftBytes.

Adaptation before non-silent frame bit allocation: Input parameters of bit allocation of non-silent frame channels are mapped to channels for continuous arrangement (existence of a silent frame channel may cause physical discrete arrangement of the non-silent frame channels), to facilitate bit allocation processing of the non-silent frame channels of a subsequent module.

Bit allocation for a non-silent frame channel: A bit allocation general module is used to perform bit allocation processing on a sound bed non-silent frame channel, and a function of the bit allocation general module is to allocate available bits to each downmixed channel in a sound bed-object multi-channel stereo sound based on parameters such as the updated quantity of pre-allocated bytes of the sound bed bedAvailbleBytes and the channel bit allocation ratio.

A quantity of input available bytes is denoted as availableBytes. In a multi-channel stereo mode, there may be an LFE channel. Generally, an amount of effective spectrum information of the LFE channel is small, the LFE channel does not need to participate in a bit allocation process in the multi-channel stereo mode, and only a fixed quantity of bits need to be allocated in advance. A quantity of pre-allocated bits of the LFE channel is related to an encoding rate. An average rate of a channel pair is denoted as cpeRate, and cpeRate is a result of converting a total encoding rate into one channel pair. If cpeRate<64 kb/s, 10 bytes are allocated to the LFE channel. If cpeRate<96 kb/s, 15 bytes are allocated to the LFE channel. If cpeRate>=96 kb/s, 20 bytes are allocated to the LFE channel. If there is the LFE channel, the quantity of pre-allocated bytes of the LFE channel is deducted from the quantity of available bytes availableBytes, and then remaining bytes after deduction are allocated to another channel other than the LFE channel.

A process of allocating available bytes availableBytes to the other channels is divided into four steps as follows:

Step 1: Allocate the bits to each channel based on chBitRatios.

A quantity of bytes of each channel may be represented as:

channelBytes[*i*]=availableBytes*chBitRatios[*i*]/(1<<4).

(1<<4) represents a maximum value range of the channel bit allocation ratio chBitRatios.

Step 2: If not all bytes are allocated in step 1, allocate remaining bytes to each channel based on a ratio represented by chBitRatios[i].

Step 3: If there are still remaining bits after step 2 ends, allocate remaining bits to a channel with a largest quantity of allocated bytes in step 1.

Step 4: If a quantity of bytes allocated to a channel exceeds an upper limit of a quantity of bytes of a single channel, allocate an excess part to the other channels.

A bit allocation general module is used to perform bit allocation processing on an object non-silent frame channel, and a function of the bit allocation general module is to allocate available bits to each downmixed channel in a sound bed-object multi-channel stereo sound based on parameters such as the updated quantity of available bytes of the object objAvailbleBytes and the channel bit allocation ratio. A specific bit allocation processing process for a non-silent frame channel of the object is the same as the bit allocation processing process for the non-silent frame channel of the sound bed signal.

Non-silent frame channel adaptation restoration: A byte quantity parameter output by non-silent frame channel bit allocation processing is inversely mapped to a physical arrangement according to the foregoing rule (existence of a silent frame channel may cause physical discrete arrangement of the non-silent frame channels), to facilitate processing of steps of range decoding, inverse quantization, and neural network inverse transform of a subsequent module.

Mixed encoding upmixing: Middle/Side (M/S) upmixing is performed on two paired channels ch1 and ch2 that are indicated by the channel pair index channelPairIndex, and an upmixing manner is consistent with M/S upmixing in a dual-channel stereo mode.

After M/S upmixing, inverse interaural level difference (ILD) processing needs to be performed on a modified discrete cosine transform (MDCT) spectrum of an upmixed channel, to restore a level difference of the channel. A process of inverse ILD processing is as follows:

```
if (scaleFlag[i] == 1){
  factor = mcIld[i]/(1<<4)
}else {
  factor= (1<<4)/mcIld[i]
}
mdctSpectrum[i] = factor * mdctSpectrum[i].
```

Herein, factor is a level adjustment factor corresponding to an ILD parameter of an $i^{th}$ channel, (1<<4) is a maximum quantized value range of mcIld, and mdctSpectrum[i] represents an MDCT coefficient vector of the $i^{th}$ channel.

Technical effects of embodiments of this application are as follows: When the multi-channel signal is a mixed signal including a sound bed signal and an object signal, and the multi-channel signal includes a silent frame, different allocation strategies mixAllocStrategy for the mixed signal including the sound bed signal and the object signal are used, and a bit saved by a silent frame is allocated to a non-silent frame, thereby improving encoding efficiency.

Improvements of embodiments of this application are as follows: The quantity of pre-allocated bits of the sound bed bedAvailbleBytes and the quantity of pre-allocated bits of the object objAvailbleBytes are determined; whether the sound bed and the object include a silent frame is determined; and if there is a silent frame, a bit is allocated to a channel of the silent frame based on side information silFlag[i] and mixAllocStrategy, and the quantity of pre-allocated bits of the sound bed bedAvailbleBytes and the quantity of pre-allocated bits of the object objAvailbleBytes are updated.

An embodiment of this application provides a method for generating a bitstream in a bit allocation mode in a sound bed-object mixed mode. A bitstream is parsed to obtain an allocation strategy mixAllocStrategy for a mixed signal including a sound bed signal and an object signal; and a bit is allocated to a silent frame channel according to the allocation strategy for the mixed signal including the sound bed signal and the object signal.

A quantity of pre-allocated bits of the sound bed bedAvailbleBytes and a quantity of pre-allocated bits of the object objAvailbleBytes are determined; whether the sound bed and the object include a silent frame is determined; and if there is a silent frame, a bit is allocated to a channel of the silent frame based on side information silFlag[i] and mixAllocStrategy, and the quantity of pre-allocated bits of the sound bed bedAvailbleBytes and the quantity of pre-allocated bits of the object obj AvailbleBytes are updated.

The bitstream is parsed to obtain silent flag information (including HasSilFlag and silFlag[i]), and whether there is a silent frame is determined based on the silent flag information.

A bit is allocated to a channel of the silent frame based on side information silFlag[i] and mixAllocStrategy, and the quantity of pre-allocated bits of the sound bed bedAvailbleBytes and the total quantity of pre-allocated bits of the object objAvailbleBytes are updated.

Whether to allocate remaining bits generated by the silent frame to the sound bed signal or the object signal is determined based on the obtained allocation strategy parameter mixAllocStrategy for the mixed signal including the sound bed signal and the object signal.

mixAllocStrategy occupies 2 bits, and indicates the allocation strategy for the mixed signal including the sound bed signal and the object signal. A value range and meaning are as follows:

0: If a redundant bit generated due to a mute mechanism belongs to the sound bed signal, the redundant bit is allocated to another sound bed signal; or if a redundant bit belongs to the object signal, the redundant bit is allocated to another object signal.

1: If a redundant bit generated due to a mute mechanism belongs to the sound bed signal, the redundant bit is allocated to another sound bed signal; or if a redundant bit belongs to the object signal, the redundant bit is allocated to another sound bed signal.

2: If a redundant bit generated due to a mute mechanism belongs to the sound bed signal, the redundant bit is allocated to another object signal; or if a redundant bit belongs to the object signal, the redundant bit is allocated to another object signal.

3: Reserved.

Two different silent frame remaining bit allocation strategies correspond to specific remaining bit allocation methods. When a multi-channel signal is a mixed signal including a sound bed signal and an object signal, the object signal is considered as a sound bed signal and bit allocation is performed according to a unified bit allocation strategy. The sound bed signal and the object signal affect each other, and quality deteriorates.

An embodiment of this application provides a method for generating a bitstream in bit allocation in a sound bed-object mixed mode. Details are as follows:

When a multi-channel signal is a mixed signal including a sound bed signal and an object signal, a bitstream is decoded to obtain a bit allocation ratio factor. The bit allocation ratio factor represents a relationship between a quantity of encoding bits of the sound bed signal and/or the object channel signal and a total quantity of available bits.

A quantity of pre-allocated bits of the sound bed signal bedAvailbleBytes and a quantity of pre-allocated bits of the object signal objAvailbleBytes are determined based on the bit allocation ratio factor.

A bit allocation quantity for each channel is determined based on the quantity of pre-allocated bits of the sound bed signal bedAvailbleBytes and the quantity of pre-allocated bits of the object signal objAvailbleBytes.

Decoding is performed based on the bit allocation quantity for each channel and the bitstream to obtain a decoded multi-channel signal.

The bit allocation ratio factor is a ratio factor of the quantity of encoding bits of the sound bed signal in the total quantity of available bits (bedBitsRatioFloat in the embodiments), or a ratio factor of the quantity of encoding bits of the object signal in the total quantity of available bits, or a ratio of the quantity of encoding bits of the sound bed signal to the quantity of encoding bits of the object signal, or a ratio of the quantity of encoding bits of the object signal to the quantity of encoding bits of the sound bed signal.

The bit allocation ratio factor is the ratio factor of the quantity of encoding bits of the sound bed signal in the total quantity of available bits. A specific method for determining the bit allocation ratio factor is: parsing the bitstream to obtain a bit allocation ratio factor index (for example, bedBitsRatio in the embodiments), and determining the bit allocation ratio factor (for example, bedBitsRatioFloat in the embodiments) based on the bit allocation ratio factor index.

The bit allocation ratio factor index may be an encoding index obtained after uniform quantization and encoding are performed on the bit allocation ratio factor, or may be an encoding index obtained after non-uniform quantization and encoding are performed on the bit allocation ratio factor.

The bit allocation ratio factor index and the bit allocation ratio factor may have a linear relationship or a non-linear relationship.

Formulas for calculating the quantity of pre-allocated bytes of the sound bed bedAvailbleBytes and the quantity of pre-allocated bytes of the object objAvailbleBytes based on the quantity of available bytes availableBytes and the floating-point ratio factor of the sound bed (bed) in terms of the total quantity of bits bedBitsRatioFloat are as follows:

bedAvailbleBytes=floor (availableBytes*bedBitsRatioFloat);

objAvailbleBytes=availableBytes−bedAvailbleBytes.

The bitstream is parsed to obtain silent flag information (including HasSilFlag and silFlag[i]), and bit allocation is performed based on the quantity of pre-allocated bits of the sound bed signal bedAvailbleBytes, the quantity of pre-allocated bits of the object signal objAvailbleBytes, and the silent flag information, to determine the bit allocation quantity for each channel.

A step of mixed encoding bit allocation is: determining, based on the silent flag information, whether there is a silent frame; if there is a silent frame, allocating a bit to a channel of the silent frame based on side information silFlag[i] (and mix AllocStrategy), and updating the quantity of pre-allocated bits of the sound bed signal bedAvailbleBytes and the total quantity of pre-allocated bits of the object signal objAvailbleBytes; and allocating a bit to a non-silent frame channel according to a non-silent frame bit allocation principle (including three steps: non-silent frame bit allocation adaptation, non-silent frame bit allocation, and non-silent frame bit allocation adaptation restoration).

An encoder side determines the bit allocation ratio factor.

Quantization and encoding are performed on the factor to obtain an index of the bit allocation ratio factor.

The index is written into the bitstream.

The bit allocation ratio factor index and the bit allocation ratio factor may have a linear relationship or a non-linear relationship.

The ratio factor is predefined based on an encoding parameter.

The encoding parameter includes an encoding rate or a signal feature parameter. The encoding parameter is predetermined.

The encoding parameter is adaptively determined based on a feature of each frame of signal, for example, a type of the signal.

The encoder side determines a mixed allocation strategy, and includes the mixed allocation strategy in the bitstream. The encoder side sends the bitstream to a decoder side.

When the silent enable flag includes an object silent enable flag and a sound bed silent enable flag, the allocation strategy for the sound bed-object mixed signal may further include another mode. Examples are as follows:

Mode 1: The object silent enable flag is 1, and a redundant bit generated due to existence of a silent channel in the object signal is allocated to another non-silent channel in the object channel.

Mode 2: The object silent enable flag is 1, and a redundant bit generated due to existence of a silent channel in the object signal is allocated to a channel on which the sound bed signal is located.

Mode 3: The sound bed silent enable flag is 1, and a redundant bit generated due to existence of a silent channel in the sound bed signal is allocated to another non-silent channel in the sound bed channel.

Mode 4: The sound bed silent enable flag is 1, and a redundant bit generated due to existence of a silent channel in the sound bed signal is allocated to a channel on which the object signal is located.

Mode 5: Both the sound bed silent enable flag and the object silent enable flag are 1, and a redundant bit generated due to existence of a silent channel in the object signal is allocated to another non-silent channel in the object channel.

Mode 6: Both the sound bed silent enable flag and the object silent enable flag are 1, and a redundant bit generated due to existence of a silent channel in the object signal is allocated to another non-silent channel in the sound bed channel.

In some other embodiments of this application, an improved mixed signal encoding scheme is as follows:

A mixed signal encoding mode in the AVS3P3 standard supports encoding and decoding of a sound bed signal and an object signal. In practical application, there are a large quantity of silent frames in the sound bed signal and the object signal. Proper processing of the silent frames can effectively improve encoding efficiency of the mixed signal. Therefore, this proposal provides an efficient encoding method for a mixed signal, to improve encoding quality of the mixed signal by properly allocating bits to a silent frame and a non-silent frame in a sound bed signal and an object signal. In addition, a bit allocation strategy for the mixed signal is implemented on an encoder side, and a decoder side does not distinguish between a sound bed and an object in the bit allocation step. A specific implementation solution includes the following.

A silent enable flag is denoted as HasSilFlag, a silent flag of an $i^{th}$ channel in all channels is denoted as silFlag[i], and the silent enable flag is a silent enable flag acting on another channel signal that does not include an LFE channel signal in a multi-channel signal. For example, HasSilFlag indicates whether there is a silent frame in another channel other than an LFE channel in all the channels. SilFlag corresponding to each channel other than the LFE channel in all the channels indicates whether the channel is a silent frame.

Occurrence of the field chBitRatios[i] since a non-LFE channel is changed to occurrence of the field since a non-LFE non-silent channel. A quantity of bits of chBitRatios[i] is changed from 4 to 6.

ILD side information is changed from a 4-bit interaural level difference parameter and a 1-bit scaling flag parameter to a 5-bit scaling factor codebook index.

Syntax of multi-channel stereo decoding is shown in Table 2, and is syntax Avs3McDec( ).

| Syntax | Quantity of bits | Mnemonic symbol |
|---|---|---|
| Avs3McDec( ) { | | |
|     for(ch = 0; ch <numChans; ch++) { | | |
|       DecodeCoreSideBits( ) | | |
|     } | | |
|     for(ch = 0; ch <numChans; ch++) { | | |
|       DecodeGroupBits( ) | | |
|     } | | |
| DecodeMcSideBits( ) | | |
| McBitsAllocationHasSiL( ) | | |
|     for(ch = 0; ch <numChans; ch++) { | | |
|       DecodeQcBits( ) | | |
|     } | | |
|     Avs3InverseQC( ) | | |
|     Avs3McacDec( ) | | |
|     for(ch = 0; ch <numChans; ch++) { | | |
|   Avs3PostSynthesis( ) | | |
|     } | | |
| } | | |

The syntax of the multi-channel stereo side information is shown in Table 3, and is syntax DecodeMcSideBits( ).

| Syntax | Quantity of bits | Mnemonic symbol |
|---|---|---|
| DecodeMcSideBits( ) { | | |
|     HasSilFlag | 1 | uimsbf |
|     if(HasSilFlag == 1){ | | |
|     for(i = 0; i <coupleChNum; i++) { | | |
|     silFlag[i] | 1 | uimsbf |
|       } | | |
|     } | | |
|     else | | |
|       for(i = 0; i <coupleChNum; i++) { | | |
|       silFlag[i] = 0 | | |
|       } | | |
|   } | | |
|     pairCnt | 4 | uimsbf |
|     for(i = 0; i < pairCnt; i++) { | | |
|       channelPairIndex | Note 1 | uimsbf |
|       mcIld[ch1] | 5 | uimsbf |
|       mcIld[ch2] | 5 | uimsbf |
|     } | | |
|     for (i = 0; i < coupleChNum; i++) { | | |
|       if(silFlag[i] == 0) { | | |
|         chBitRatios[i] | 6 | uimsbf |
|       } | | |
|     } | | |
| } | | |

Note 1:
A quantity of bits of channelPairIndex is determined by a quantity coupleChNum of channels that participate in pairing. A calculation manner is floor(log2(coupleChNum * (coupleChNum − 1)/2 − 1)) + 1.

Semantic McBitsAllocationHasSiL( ) is multi-channel stereo bit allocation.

coupleChNum is a channel quantity of all other channels that do not include an LFE channel in the multi-channel signal.

HasSilFlag occupies 1 bit, and indicates whether there is a silent frame in channels of a current frame of an audio signal. 0 indicates that there is no silent frame, and 1 indicates that there is a silent frame.

silFlag[i] occupies 1 bit. 0 indicates that an $i^{th}$ channel is a non-silent frame, and 1 indicates that an $i^{th}$ channel is a silent frame.

mcIld[ch1] or mcIld[ch2] occupies 5 bits. A quantized codebook index of an interaural level difference ILD parameter of each channel in a current channel pair is used to restore a level of a decoding spectrum.

pairCnt occupies 4 bits, and indicates a quantity of channel pairs of a current frame.

A channel pair index is represented as channelPairIndex. A quantity of bits of channelPairIndex is related to a total quantity of channels. For details, refer to Note 1 in the foregoing table. channelPairIndex indicates an index of a channel pair, and may be parsed to obtain index values, that is, ch1 and ch2, of two channels in the current channel pair.

chBitRatios occupies 6 bits, and indicates a bit allocation ratio of each channel.

A decoding process is as follows:

Mixed signal bit allocation: Mixed signal bit allocation is based on a silent channel flag and a bit allocation ratio parameter that are decoded from a bitstream, and remaining available bits obtained after other side information is removed are allocated to each downmixed channel in a multi-channel stereo sound, to complete subsequent steps of range decoding, inverse quantization, and neural network inverse transform.

A quantity of remaining available bytes obtained after other side information is removed in a current frame is denoted as availableBytes.

In a multi-channel stereo mode, there may be a silent channel. The silent channel does not need to participate in a bit allocation process in the multi-channel stereo mode, and only a fixed quantity of bytes need to be allocated in advance. The quantity of bytes is 8. If there is the silent channel, the quantity of pre-allocated bytes of the silent channel is deducted from the quantity of available bytes availableBytes, and then remaining bytes after deduction are allocated to another channel other than the silent channel.

A process of allocating available bytes availableBytes to the other channels is divided into five steps as follows:

Step 1: A quantity of pre-allocated safe bytes of each channel is safeBits, and a quantity of safe bytes is 8. The quantity of safe bytes is deducted from the quantity of available bytes availableBytes. A quantity of remaining bytes availableBytes after the deduction continues to be used for allocation in a subsequent step.

Step 2: Allocate a bit to each channel based on chBitRatios. A quantity of bytes of each channel may be represented as:

channelBytes[$i$]=availableBytes*chBitRatios[$i$]/(1<<6).

(1<<6) represents a maximum value range of the channel bit allocation ratio chBitRatios.

Step 3: If not all bytes are allocated in step 2, allocate remaining bytes to each channel based on a ratio represented by chBitRatios[i].

Step 4: If there are still remaining bits after step 3 ends, allocate remaining bits to a channel with a largest quantity of allocated bytes in step 1.

Step 5: If a quantity of bytes allocated to a channel exceeds an upper limit of a quantity of bytes of a single channel, allocate an excess part to the other channels.

The following describes an upmixing process. M/S upmixing is performed on two paired channels ch1 and ch2 that are indicated by the channel pair index channelPairIndex, and an upmixing manner is consistent with M/S upmixing in a dual-channel stereo mode. After the M/S upmixing, inverse ILD processing needs to be performed on an MDCT spectrum of an upmixed channel, to restore a level difference of the channel. Pseudocode of the inverse ILD processing is as follows:

factor=mcIldCodebook[mcIld[$i$]], mdctSpectrum[$i$]=factor*mdctSpectrum[$i$].

Herein, factor is a level adjustment factor corresponding to an ILD parameter of an $i^{th}$ channel, mcIldCodebook is a quantized codebook of the ILD parameter, as shown in Table 4, mcIld[i] represents a codebook index corresponding to the ILD parameter of the $i^{th}$ channel, and mdctSpectrum[i] represents an MDCT coefficient vector of the $i^{th}$ channel. The following Table 4 is an mcILD code table.

| Index | Index value |
|---|---|
| 0 | 1.777777778 |
| 1 | 0.750000000 |
| 2 | 0.562500000 |
| 3 | 3.200000000 |
| 4 | 5.333333333 |
| 5 | 0.812500000 |
| 6 | 1.066666667 |
| 7 | 4.000000000 |
| 8 | 0.187500000 |
| 9 | 1.142857143 |
| 10 | 0.437500000 |
| 11 | 1.454545455 |
| 12 | 0.125000000 |
| 13 | 0.625000000 |
| 14 | 2.285714286 |
| 15 | 0.500000000 |
| 16 | 16.00000000 |
| 17 | 2.000000000 |
| 18 | 0.875000000 |
| 19 | 0.250000000 |
| 20 | 1.333333333 |
| 21 | 0.375000000 |
| 22 | 1.600000000 |
| 23 | 8.000000000 |

-continued

| Index | Index value |
|---|---|
| 24 | 0.687500000 |
| 25 | 0.062500000 |
| 26 | 1.230769231 |
| 27 | 0.312500000 |
| 28 | 0.937500000 |
| 29 | 2.666666667 |

It should be noted that, for brief description, the foregoing method embodiments are expressed as a series of action combinations. However, a person skilled in the art should appreciate that this application is not limited to the described order of the actions, because according to this application, some steps may be performed in other orders or simultaneously. In addition, the related actions and modules are not necessarily mandatory to this application.

To better implement the solutions of embodiments of this application, a related apparatus for implementing the solutions is further provided below.

Figure 10:
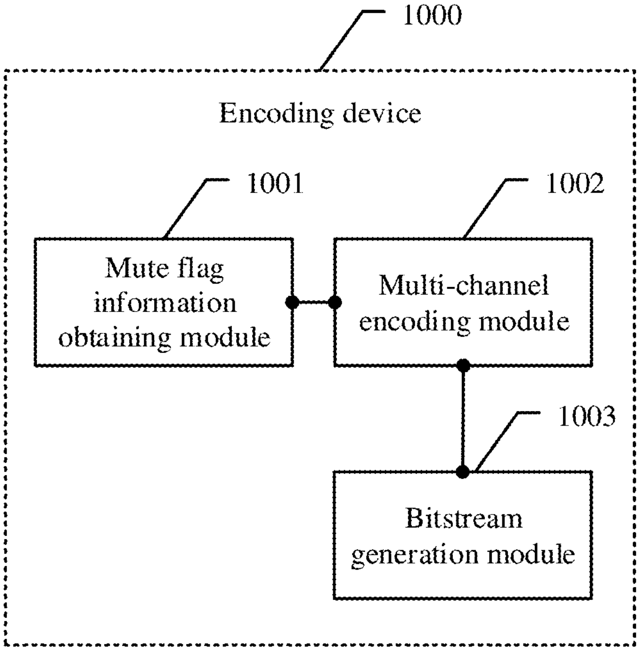
FIG. 10 is a diagram of a composition structure of an encoding device according to an embodiment of this application.

As shown in FIG. 10, an encoding device 1000 provided in an embodiment of this application may include a silent flag information obtaining module 1001, a multi-channel encoding module 1002, and a bitstream generation module 1003.

The silent flag information obtaining module is configured to obtain silent flag information of a multi-channel signal, where the silent flag information includes a silent enable flag and/or a silent flag.

The multi-channel encoding module is configured to perform multi-channel encoding processing on the multi-channel signal to obtain a transmission channel signal of each transmission channel.

The bitstream generation module is configured to generate a bitstream based on the transmission channel signal of each transmission channel and the silent flag information, where the bitstream includes the silent flag information and a multi-channel encoding result of the transmission channel signal.

Figure 11:
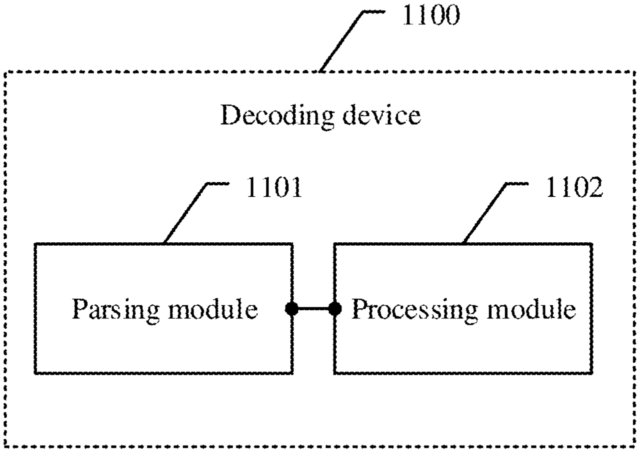
FIG. 11 is a diagram of a composition structure of a decoding device according to an embodiment of this application.

As shown in FIG. 11, a decoding device 1100 provided in an embodiment of this application may include a parsing module 1101 and a processing module 1102.

The parsing module is configured to parse a bitstream from an encoding device to obtain silent flag information, and determine encoded information of each transmission channel based on the silent flag information, where the silent flag information includes a silent enable flag and/or a silent flag.

The processing module is configured to decode the encoded information of each transmission channel to obtain a decoded signal of each transmission channel.

The processing module is further configured to perform multi-channel decoding processing on the decoded signal of each transmission channel to obtain a multi-channel decoding output signal.

It should be noted that because content such as information exchange between the modules/units of the apparatus and the execution processes thereof is based on a same concept as the method embodiments of this application, technical effects brought are the same as those of the method embodiments of this application. For specific content, refer to the descriptions in the foregoing method embodiments of this application. Details are not described herein again.

An embodiment of this application further provides a computer storage medium. The computer storage medium stores a program. The program is executed to perform some or all of the steps recorded in the method embodiments.

Figure 12:
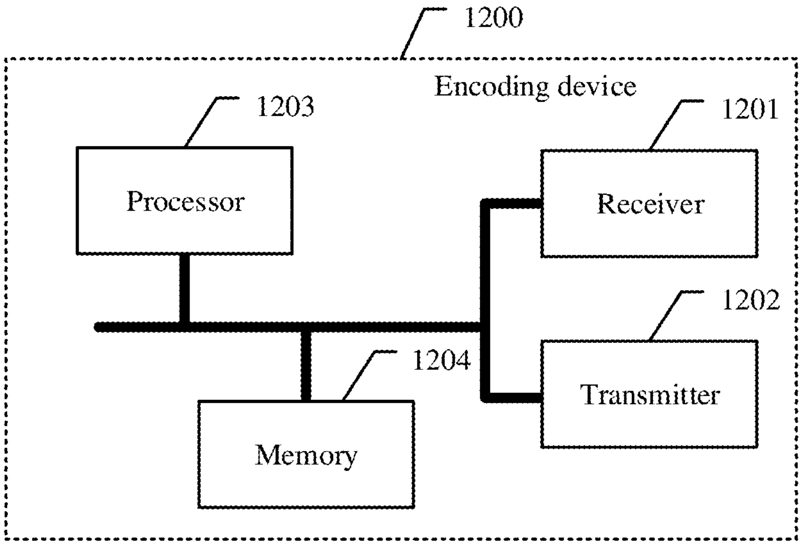
FIG. 12 is a diagram of a composition structure of another encoding device according to an embodiment of this application.

The following describes another encoding device provided in an embodiment of this application. As shown in FIG. 12, an encoding device 1200 includes: a receiver 1201, a transmitter 1202, a processor 1203, and a memory 1204 (where there may be one or more processors 1203 in the encoding device 1200, and one processor is used as an example in FIG. 12). In some embodiments of this application, the receiver 1201, the transmitter 1202, the processor 1203, and the memory 1204 may be connected through a bus or in another manner. In FIG. 12, connection through a bus is used as an example.

The memory 1204 may include a read-only memory and a random access memory, and provide instructions and data for the processor 1203. A part of the memory 1204 may further include a non-volatile random access memory NVRAM). The memory 1204 stores an operating system and operation instructions, an executable module or a data structure, a subset thereof, or an extended set thereof. The operation instructions may include various operation instructions used to implement various operations. The operating system may include various system programs, to implement various basic services and process a hardware-based task.

The processor 1203 controls an operation of the encoding device, and the processor 1203 may further be referred to as a central processing unit (CPU). In specific application, components of the encoding device are coupled together through a bus system. In addition to a data bus, the bus system may further include a power bus, a control bus, a status signal bus, and the like. However, for clear description, various buses are referred to as the bus system in the figure.

The method disclosed in embodiments of this application may be applied to the processor 1203, or implemented by the processor 1203. The processor 1203 may be an integrated circuit chip and has a signal processing capability. In an implementation process, steps of the foregoing method may be completed by using an integrated logic circuit of hardware in the processor 1203 or instructions in a form of software. The foregoing processor 1203 may be a general-purpose processor, a digital signal processor (DSP), an application-specific integrated circuit ASIC), a field-programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed by a hardware decoding processor, or performed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1204. The processor 1203 reads information in the memory 1204, and completes the steps of the foregoing methods in combination with hardware of the processor 1203.

The receiver 1201 may be configured to receive entered digital or character information, and generate signal input related to related settings and function control of the encoding device. The transmitter 1202 may include a display device such as a display, and the transmitter 1202 may be configured to output digital or character information through an external interface.

In embodiments of this application, the processor 1203 is configured to perform the method performed by the encoding device in FIG. 4, FIG. 6, and FIG. 7 in the foregoing embodiments.

Figure 13:
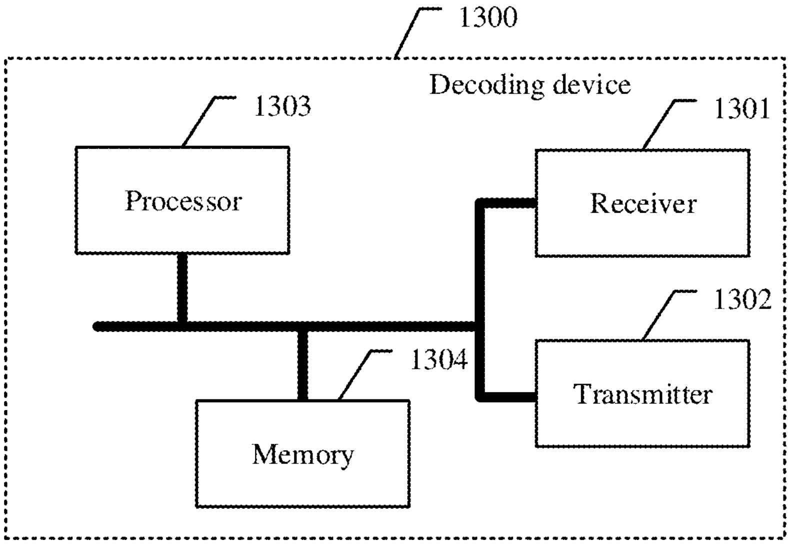
FIG. 13 is a diagram of a composition structure of another decoding device according to an embodiment of this application.

The following describes another decoding device provided in an embodiment of this application. As shown in FIG. 13, a decoding device 1300 includes: a receiver 1301, a transmitter 1302, a processor 1303, and a memory 1304 (where there may be one or more processors 1303 in the decoding device 1300, and one processor is used as an example in FIG. 13). In some embodiments of this application, the receiver 1301, the transmitter 1302, the processor 1303, and the memory 1304 may be connected through a bus or in another manner. In FIG. 13, connection through a bus is used as an example.

The memory 1304 may include a read-only memory and a random access memory, and provide instructions and data for the processor 1303. A part of the memory 1304 may further include an NVRAM. The memory 1304 stores an operating system and operation instructions, an executable module or a data structure, a subset thereof, or an extended set thereof. The operation instructions may include various operation instructions used to implement various operations. The operating system may include various system programs, to implement various basic services and process a hardware-based task.

The processor 1303 controls an operation of the decoding device, and the processor 1303 may further be referred to as a CPU. In specific application, components of the decoding device are coupled together through a bus system. In addition to a data bus, the bus system may further include a power bus, a control bus, a status signal bus, and the like. However, for clear description, various buses are referred to as the bus system in the figure.

The method disclosed in embodiments of this application may be applied to the processor 1303, or implemented by the processor 1303. The processor 1303 may be an integrated circuit chip and has a signal processing capability. In an implementation process, steps of the foregoing method may be completed by using an integrated logic circuit of hardware in the processor 1303 or instructions in a form of software. The processor 1303 may be a general-purpose processor, a DSP, an ASIC, an FPGA or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed by a hardware decoding processor, or performed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1304. The processor 1303 reads information in the memory 1304, and completes the steps of the foregoing methods in combination with hardware of the processor 1303.

In embodiments of this application, the processor 1303 is configured to perform the method performed by the decoding device in FIG. 5, FIG. 8, and FIG. 9 in the foregoing embodiments.

In another possible design, when the encoding device or the decoding device is a chip in a terminal, the chip includes a processing unit and a communication unit. The processing unit may be, for example, a processor, and the communication unit may be, for example, an input/output interface, a pin, or a circuit. The processing unit may execute computer-executable instructions stored in a storage unit, so that the chip in the terminal performs the audio encoding method according to any item of the first aspect or the audio decoding method according to any item of the second aspect. Optionally, the storage unit is a storage unit in the chip, for example, a register or a buffer. Alternatively, the storage unit may be a storage unit in the terminal but outside the chip, for example, a read-only memory (ROM), another type of static storage device that can store static information and instructions, or a random access memory (RAM).

The processor mentioned above may be a general-purpose central processing unit, a microprocessor, an ASIC, or one or more integrated circuits configured to control program execution of the method in the first aspect or the second aspect.

In addition, it should be noted that the described apparatus embodiment is merely an example. The units described as separate parts may or may not be physically separate, and parts displayed as units may or may not be physical units, may be located in one place, or may be distributed on a plurality of network units. Some or all of the modules may be selected according to an actual requirement to achieve the objectives of the solutions in the embodiments. In addition, in the accompanying drawings of the apparatus embodiments provided by this application, connection relationships between modules indicate that the modules have communication connections with each other, which may be specifically implemented as one or more communication buses or signal cables.

Based on the description of the foregoing implementations, a person skilled in the art may clearly understand that this application may be implemented by using software in addition to necessary universal hardware, or by using dedicated hardware, including a dedicated integrated circuit, a dedicated CPU, a dedicated memory, a dedicated component, and the like. Generally, any function that is performed by a computer program can be easily implemented by using corresponding hardware. Moreover, a specific hardware structure used to implement a same function may be in various forms, for example, in a form of an analog circuit, a digital circuit, or a dedicated circuit. However, as for this application, a software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, a network device, or the like) to perform the methods described in embodiments of this application.

All or some of the foregoing embodiments may be implemented by software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The invention claimed is:

1. A multi-channel signal encoding method, comprising:

obtaining silent flag information of a multi-channel signal, wherein the silent flag information comprises a silent enable flag and/or a silent flag;

performing multi-channel encoding processing on the multi-channel signal to obtain a transmission channel signal of each transmission channel; and generating a bitstream based on the transmission channel signal of each transmission channel and the silent flag information, wherein the bitstream comprises the silent flag information and a multi-channel encoding result of the transmission channel signal.

2. The method according to claim 1, wherein the multi-channel signal comprises a sound bed signal and/or an object signal; and the silent flag information comprises the silent enable flag, and the silent enable flag comprises a global silent enable flag or a partial silent enable flag, wherein the global silent enable flag is a silent enable flag acting on the multi-channel signal; or the partial silent enable flag is a silent enable flag acting on a part of channels in the multi-channel signal.

3. The method according to claim 2, wherein when the silent enable flag is the partial silent enable flag, the partial silent enable flag is an object silent enable flag acting on the object signal, or the partial silent enable flag is a sound bed silent enable flag acting on the sound bed signal, or the partial silent enable flag is a silent enable flag acting on another channel signal that does not comprise a non-low frequency effect (LFE) channel signal in the multi-channel signal, or the partial silent enable flag is a silent enable flag acting on a channel signal that participates in pairing in the multi-channel signal.

4. The method according to claim 1, wherein the multi-channel signal comprises a sound bed signal and an object signal;

the silent flag information comprises the silent enable flag, and the silent enable flag comprises a sound bed silent enable flag and an object silent enable flag; and the silent enable flag occupies a first bit and a second bit, the first bit is used to carry a value of the sound bed silent enable flag, and the second bit is used to carry a value of the object silent enable flag.

5. The method according to claim 1, wherein the obtaining silent flag information of a multi-channel signal comprises:

obtaining the silent flag information based on control signaling input to an encoding device; or obtaining the silent flag information based on an encoding parameter of an encoding device; or performing silent flag detection on each channel of the multi-channel signal to obtain the silent flag information.

6. The method according to claim 5, wherein the silent flag information comprises the silent enable flag and the silent flag; and the performing silent flag detection on each channel of the multi-channel signal to obtain the silent flag information comprises:

performing silent flag detection on each channel of the multi-channel signal to obtain the silent flag of each channel; and determining the silent enable flag based on the silent flag of each channel.

7. The method according to claim 1, wherein the silent flag information comprises the silent flag, or the silent flag information comprises the silent enable flag and the silent flag; and the silent flag indicates whether each channel on which the silent enable flag acts is a silent channel, and the silent channel is a channel that does not need to be encoded or a channel that needs to be encoded at a low bit rate.

8. The method according to claim 1, wherein the generating a bitstream based on the transmission channel signal of each transmission channel and the silent flag information comprises:

adjusting an initial multi-channel processing manner based on the silent flag information to obtain an adjusted multi-channel processing manner; and encoding the transmission channel signal of each transmission channel in the adjusted multi-channel processing manner to obtain the bitstream.

9. The method according to claim 1, wherein the generating a bitstream based on the transmission channel signal of each transmission channel and the silent flag information comprises:

performing bit allocation for each transmission channel based on the silent flag information, a quantity of available bits, and multi-channel side information to obtain a bit allocation result of each transmission channel; and encoding the transmission channel signal of each transmission channel based on the bit allocation result of the transmission channel to obtain the bitstream.

10. The method according to claim 9, wherein the performing bit allocation for each transmission channel based on the silent flag information, a quantity of available bits, and multi-channel side information comprises:

performing bit allocation for each transmission channel based on the quantity of available bits and the multi-channel side information according to a bit allocation strategy corresponding to the silent flag information.

11. The method according to claim 10, wherein the multi-channel side information comprises a channel bit allocation ratio; and the channel bit allocation ratio indicates a bit allocation ratio between non-low frequency effect LFE channels in the multi-channel signal.

12. A multi-channel signal decoding method, comprising:

parsing a bitstream from an encoding device to obtain silent flag information, and determining encoded information of each transmission channel based on the silent flag information, wherein the silent flag information comprises a silent enable flag and/or a silent flag;

decoding the encoded information of each transmission channel to obtain a decoded signal of each transmission channel; and performing multi-channel decoding processing on the decoded signal of each transmission channel to obtain a multi-channel decoding output signal.

13. The method according to claim 12, wherein the parsing a bitstream from an encoding device to obtain silent flag information comprises:

parsing the bitstream to obtain a silent flag of each channel; or parsing the bitstream to obtain the silent enable flag, and if the silent enable flag is a first value, parsing the bitstream to obtain the silent flag; or parsing the bitstream to obtain a sound bed silent enable flag and/or an object silent enable flag and a silent flag of each channel; or parsing the bitstream to obtain a sound bed silent enable flag and/or an object silent enable flag, and parsing the bitstream to obtain silent flags of a part of channels in all channels based on the sound bed silent enable flag and/or the object silent enable flag.

14. The method according to claim 12, wherein the decoding the encoded information of each transmission channel comprises:

parsing the bitstream to obtain multi-channel side information;

performing bit allocation for each transmission channel based on the multi-channel side information and the silent flag information to obtain a quantity of encoding bits of each transmission channel; and decoding the encoded information of each transmission channel based on the quantity of encoding bits of each transmission channel.

15. The method according to claim 14, wherein the multi-channel side information comprises at least one of the following: a quantized codebook index of an interaural level difference parameter, a quantity of channel pairs, a channel pair index, and a channel bit allocation ratio;

the quantized codebook index of the interaural level difference parameter indicates a quantized codebook index of an interaural level difference (ILD) parameter of each channel in all channels;

the quantity of channel pairs indicates a quantity of channel pairs of a current frame of a multi-channel signal;

the channel pair index indicates an index of a channel pair; and the channel bit allocation ratio indicates a bit allocation ratio between non-low frequency effect LFE channels in the multi-channel signal.

16. The method according to claim 12, wherein after the performing multi-channel decoding processing on the decoded signal of each transmission channel to obtain a multi-channel decoding output signal, the method further comprises:

post-processing the multi-channel decoding output signal, wherein the post-processing comprises at least one of the following: bandwidth extension decoding, inverse temporal noise shaping, inverse frequency-domain noise shaping, and inverse time-frequency transform.

17. An encoding device, wherein the encoding device comprises a processor and a memory, and the processor and the memory communicate with each other;

the memory is configured to store instructions; and the processor is configured to execute the instructions in the memory to:

obtain silent flag information of a multi-channel signal, wherein the silent flag information comprises a silent enable flag and/or a silent flag;

perform multi-channel encoding processing on the multi-channel signal to obtain a transmission channel signal of each transmission channel; and generate a bitstream based on the transmission channel signal of each transmission channel and the silent flag information, wherein the bitstream comprises the silent flag information and a multi-channel encoding result of the transmission channel signal.

18. The encoding device according to claim 17, wherein the processor is further configured to execute the instructions in the memory to:

perform multi-channel signal screening on the multi-channel signal to obtain a screened multi-channel signal;

perform pairing processing on the screened multi-channel signal to obtain a multi-channel paired signal; and perform downmixing processing and bit allocation processing on the multi-channel paired signal to obtain the transmission channel signal of each transmission channel and the multi-channel side information.

19. A decoding device, wherein the decoding device comprises a processor and a memory, and the processor and the memory communicate with each other;

the memory is configured to store instructions; and the processor is configured to execute the instructions in the memory to:

parse a bitstream from an encoding device to obtain silent flag information, and determine encoded information of each transmission channel based on the silent flag information, wherein the silent flag information comprises a silent enable flag and/or a silent flag; and decode the encoded information of each transmission channel to obtain a decoded signal of each transmission channel, wherein perform multi-channel decoding processing on the decoded signal of each transmission channel to obtain a multi-channel decoding output signal.

20. The decoding device according to claim 19, wherein the processor is further configured to execute the instructions in the memory to:

post-process the multi-channel decoding output signal, wherein the post-processing comprises at least one of the following: bandwidth extension decoding, inverse temporal noise shaping, inverse frequency-domain noise shaping, and inverse time-frequency transform.

* * * * *